United States Patent
Tamaizumi et al.

(10) Patent No.: US 9,051,004 B2
(45) Date of Patent: Jun. 9, 2015

(54) ELECTRIC POWER STEERING SYSTEM

(71) Applicant: JTEKT CORPORATION, Osaka-shi, Osaka (JP)

(72) Inventors: Terutaka Tamaizumi, Okazaki (JP); Masayuki Kita, Okazaki (JP); Isao Namikawa, Okazaki (JP); Hirozumi Eki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/463,216

(22) Filed: Aug. 19, 2014

(65) Prior Publication Data

US 2015/0057892 A1 Feb. 26, 2015

(30) Foreign Application Priority Data

Aug. 26, 2013 (JP) .................................. 2013-174700
Feb. 14, 2014 (JP) .................................. 2014-026804

(51) Int. Cl.
 A01B 69/00 (2006.01)
 B62D 5/04 (2006.01)
 B62D 6/10 (2006.01)

(52) U.S. Cl.
 CPC ................ B62D 5/0463 (2013.01); B62D 6/10 (2013.01)

(58) Field of Classification Search
 None
 See application file for complete search history.

(56) References Cited

U.S. PATENT DOCUMENTS 5,508,921 A * 4/1996 Chikuma et al. ................. 701/41
2009/0112406 A1* 4/2009 Fujii et al. ........................ 701/42
2010/0217487 A1* 8/2010 Murakami ....................... 701/42

FOREIGN PATENT DOCUMENTS

FR 2819473 A1 7/2002
JP 2006-175940 A 7/2006
JP A-2011-046293 3/2011

OTHER PUBLICATIONS

Feb. 23, 2015 Search Report issued in European Patent Application No. 14181622.3.

* cited by examiner

*Primary Examiner* — Thomas Tarcza
*Assistant Examiner* — Adam Alharbi
(74) *Attorney, Agent, or Firm* — Oliff PLC

(57) ABSTRACT

A controller of an electric power steering system includes: a basic assist component computing unit (60) that computes a first assist component (Ta1*) based on a steering torque (Th); a steered angle command value computing unit (61) that computes a steered angle command value (θt*) based on the sum of the steering torque (Th) and the first assist component (Ta1*); and a steered angle feedback controller (62) that computes a second assist component (Ta2*) through feedback control on an actual steered angle (θt). The controller further includes: a correction component computing unit (65) that computes a correction component (Tc*) based on a steering angle (θs); and an assist command value computing unit (50) that computes an assist command value (Ta*) by subtracting the correction component (Tc*) from the sum of the first assist component (Ta1*) and the second assist component (Ta2*).

15 Claims, 18 Drawing Sheets

F I G . 13
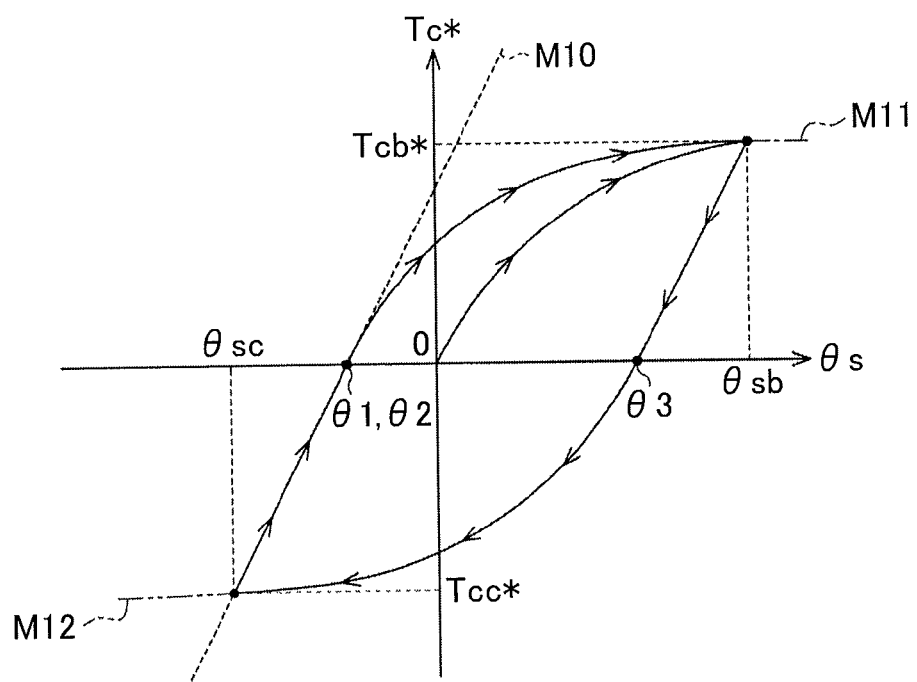

F I G . 20
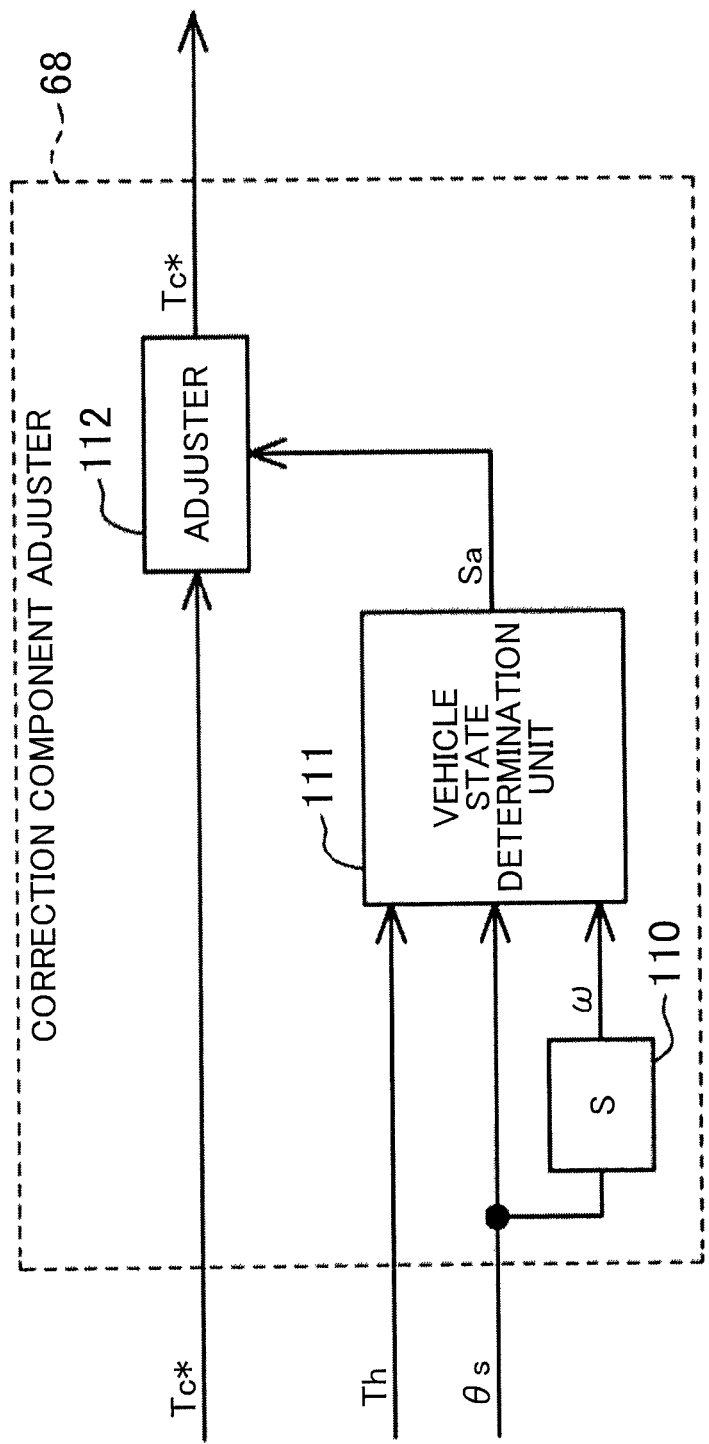

ELECTRIC POWER STEERING SYSTEM

INCORPORATION BY REFERENCE

The disclosures of Japanese Patent Applications No. 2013-174700 and No. 2014-026804 respectively filed on Aug. 26, 2013 and Feb. 14, 2014, each including the specification, drawings and abstract, are incorporated herein by reference in their entireties.

BACKGROUND OF THE INVENTION

1. Field of the Invention

The invention relates to an electric power steering system that assists a vehicle steering operation.

2. Description of the Related Art

Japanese Patent Application Publication No. 2011-46293 (JP 2011-46293 A) describes an electric power steering system that includes a steering mechanism that steers steered wheels of a vehicle in response to an operation of a steering wheel, and an assist mechanism that applies assist force to the steering mechanism. The assist mechanism is provided with various sensors that detect, for example, a steering torque applied to the steering wheel and a vehicle speed, and a controller that controls driving of a motor based on the values detected by the sensors. The controller sets an assist command value based on the steering torque and the vehicle speed, and controls driving of the motor such that a torque actually output from the motor follows the assist command value. Specifically, the controller computes a current command value corresponding to a target assist force, based on the steering torque and the vehicle speed. The current command value is a target value of a current to be supplied to the motor. The controller sets the absolute value of the current command value to a larger value as the absolute value of the steering torque is larger, or as the vehicle speed is lower. In a region in which the absolute value of the steering torque is smaller than or equal to a prescribed threshold, that is, in a so-called dead band region, the controller sets the current command value to zero irrespective of the magnitude of the steering torque. The controller controls driving of the motor by executing feedback control for causing an actual current value, which is a value of current actually supplied to the motor, to follow the current command value.

When the steering wheel is positioned near the neutral position, the steering torque applied to the steering wheel is considerably low. Thus, in the electric power steering system, the current command value is set to zero. That is, the motor is stopped, and thus assist force is no longer applied to the steering mechanism. In this situation, a driver's steering feel is strongly influenced by internal friction of the steering mechanism, for example, friction generated in a speed reducer that is disposed between the steering mechanism and the motor. Thus, the driver's steering feel is dominated by a sense of friction. This may be a factor of deterioration of the driver's steering feel.

SUMMARY OF THE INVENTION

One object of the invention is to provide an electric power steering system that makes it possible to improve the steering feel in a situation where a steering wheel is positioned near the neutral position.

An electric power steering system according to an aspect of the invention includes: an assist mechanism that applies assist force generated by a motor to a steering mechanism of a vehicle; and a controller that controls driving of the motor based on an assist command value that is a target value of a torque output from the motor. The controller includes: a basic assist component computing unit that computes a first assist component that is a basic component of the assist command value, based on a steering torque applied to a steering wheel; a steered angle command value computing unit that computes a steered angle command value that is a target value of a steered angle of steered wheels, based on a sum of the steering torque and the first assist component; a steered angle feedback controller that computes a second assist component by executing steered angle feedback control for causing an actual steered angle of the steered wheels to follow the steered angle command value; a correction component computing unit that computes a correction component based on a steering angle of the steering wheel; and an assist command value computing unit that computes the assist command value on the basis of a value obtained by subtracting the correction component from a sum of the first assist component and the second assist component.

According to the above aspect, the assist command value contains the second assist component obtained through the steered angle feedback control. Thus, when assist force corresponding to the assist command value is applied to the steering mechanism, the actual steered angle follows the steered angle command value. With the steered angle feedback control, even when friction is generated as the steering mechanism is driven, the assist force is adjusted such that the actual steered angle follows the steered angle command value. As a result, the assist force with which internal friction of the steering mechanism is cancelled out is applied to the steering mechanism. Thus, it is possible to eliminate a sense of friction that a driver will feel while operating the steering wheel at a position near the neutral position.

According to the above aspect, the correction component is subtracted from the assist command value, and thus the assist force that is applied to the steering mechanism is decreased by the amount of decrease in the assist command value. Thus, the steering torque required to operate the steering wheel is increased by an amount corresponding to the correction component. As a result, it is possible to give the driver a steering feel corresponding to the correction component. Therefore, it is possible to produce a desired steering feel that the driver feels when the steering wheel is positioned near the neutral position, by appropriately adjusting the relationship between the steering angle and the correction component.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 13 is a graph illustrating the manner of computing a correction component based on a change in the steering angle in the first embodiment;

FIG. 20 is a control block diagram illustrating the configuration of a correction component adjuster in the second embodiment;

DETAILED DESCRIPTION OF EMBODIMENTS

Hereinafter, an electric power steering system according to a first embodiment of the invention will be described. First, the outline of the electric power steering system will be described.

Figure 1:
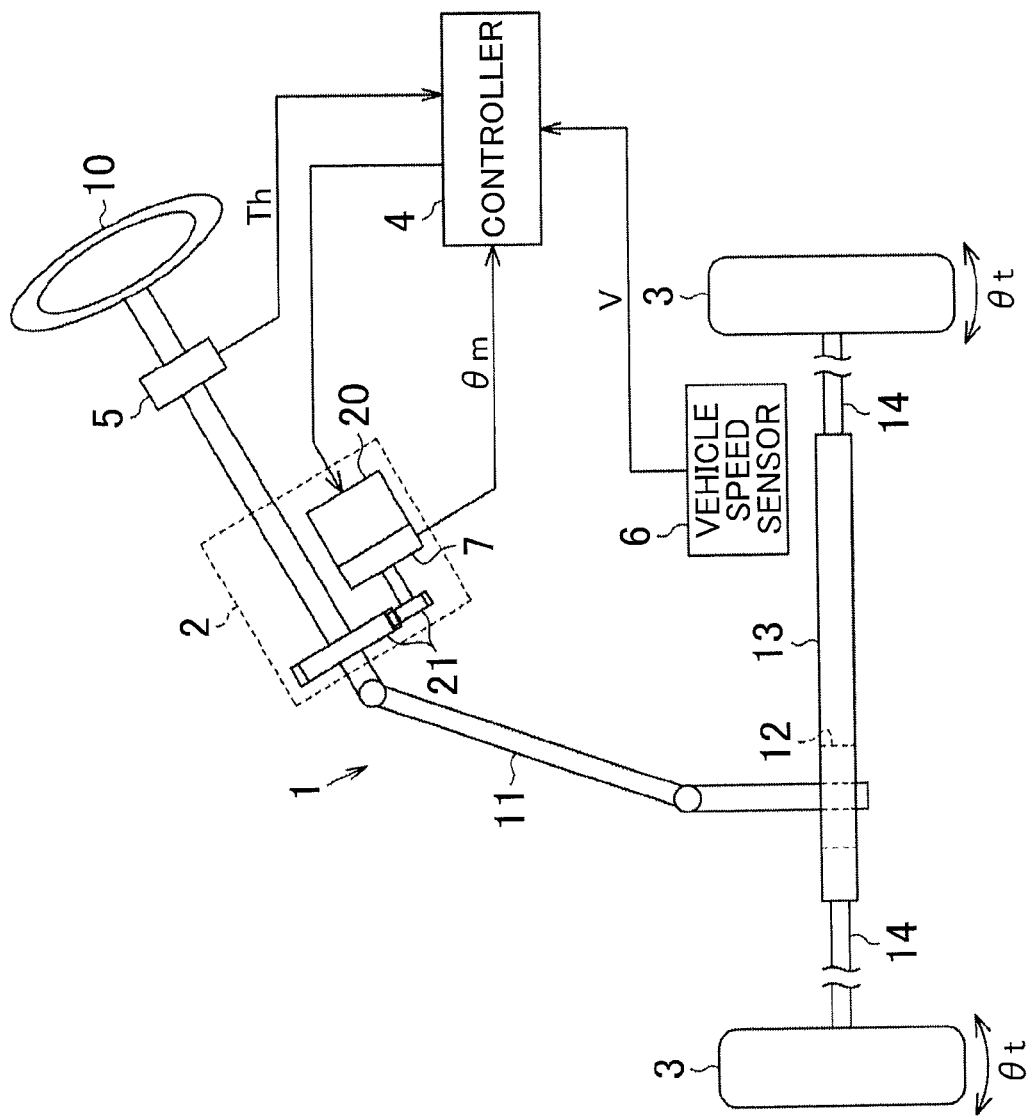
FIG. 1 is a block diagram illustrating the schematic configuration of an electric power steering system according to a first embodiment of the invention.

As illustrated in FIG. 1, the electric power steering system includes a steering mechanism 1 that steers steered wheels 3 in response to a driver's operation of a steering wheel 10, and an assist mechanism 2 that assists a driver's steering operation.

The steering mechanism 1 includes a steering shaft 11 that serves as a rotary shaft of the steering wheel 10, and a rack shaft 13 that is connected to a lower end portion of the steering shaft 11 via a rack-and-pinion mechanism 12. In the steering mechanism 1, when the steering shaft 11 is rotated in response to a driver's operation of the steering wheel 10, the rotary motion is converted into a linear reciprocating motion of the rack shaft 23 in its axial direction via the rack-and-pinion mechanism 12. The linear reciprocating motion of the rack shaft 13 in the axial direction is transmitted to the steered wheels 3 respectively connected to opposite ends of the rack shaft 13 via tie rods 14. In this way, a steered angle θt of the steered wheels 3 is changed and thus a travelling direction of a vehicle is changed.

The assist mechanism 2 includes a motor 20 that applies assist force to the steering shaft 11. The motor 20 is a brushless motor. As the rotation output from the motor 20 is transmitted to the steering shaft 11 via the speed reducer 21, motor torque is applied to the steering shaft 11 and thus a driver's steering operation is assisted.

The electric power steering system is provided with various sensors that detect the amount of operation of the steering wheel 10 and the vehicle state quantities. For example, the steering shaft 11 is provided with a torque sensor 5 that detects a steering torque Th applied to the steering shaft 11 in response to a driver's steering operation of the steering wheel 10. The vehicle is provided with a vehicle speed sensor 6 that detects a vehicle speed V. The motor 20 is provided with a rotation angle sensor 7 that detects a rotation angle θm. Outputs from the sensors 5 to 7 are input into a controller 4. The controller 4 controls driving of the motor 20 based on the output from the sensors 5 to 7.

Figure 2:
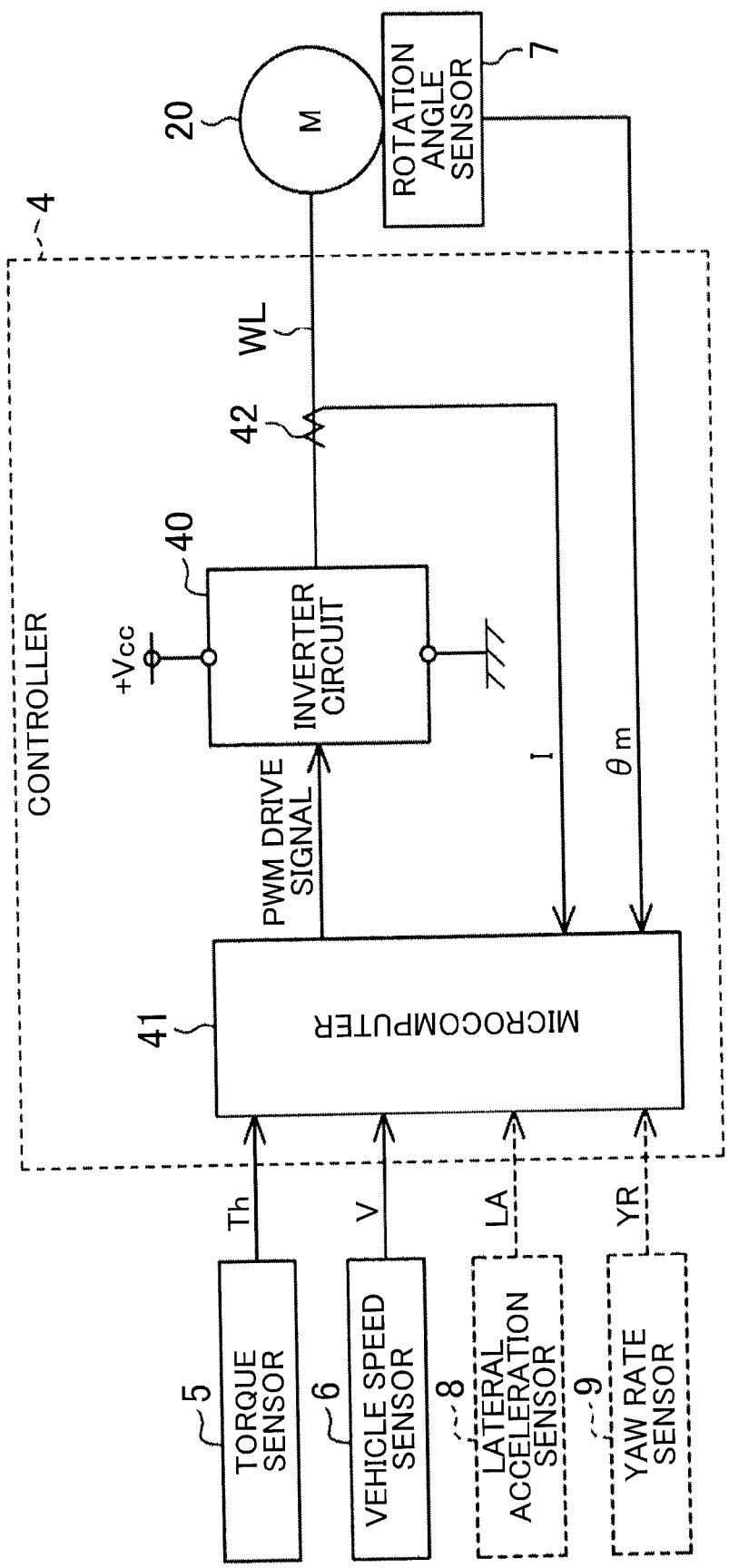
FIG. 2 is a block diagram illustrating the configuration of a controller in the first embodiment.

As illustrated in FIG. 2, the controller 4 includes an inverter circuit 40 that converts a direct-current voltage supplied from a power supply such as an in-vehicle battery (a power supply voltage "+Vcc") into three-phase (a U-phase, a V-phase, and a W-phase) alternating-current voltages, and a microcomputer 41 that drives the inverter circuit 40 through PWM (pulse width modulation).

The inverter circuit 40 converts a direct-current voltage supplied from the power supply into three-phase alternating-current voltages based on a PWM drive signal from the microcomputer 41. The three-phase alternating current voltages are supplied to the motor 20 through power supply lines WL. The power supply lines WL are respectively provided with current sensors 42 that detect the three-phase current values I, which are values of the three-phase currents to be supplied to the motor 20. In FIG. 2, for the purpose of convenience of explanation, the three-phase power supply lines WL are collectively illustrated as one power supply line WL, and the three-phase current sensors 52 are collectively illustrated as one current sensor 52. The outputs from the current sensors 42 are input into the microcomputer 41.

The outputs from the torque sensor 5, the vehicle speed sensor 6, and the rotation angle sensor 7 are input into the microcomputer 41. The microcomputer 41 generates PWM drive signals in a prescribed control cycle based on the steering torque Th, the vehicle speed V, the motor rotation angle θm, and the three-phase current values I, which are detected by the sensors. The microcomputer 41 drives the inverter circuit 40 through PWM by outputting the PWM drive signals to the inverter circuit 40, thus controlling driving of the motor 20.

Figure 3:
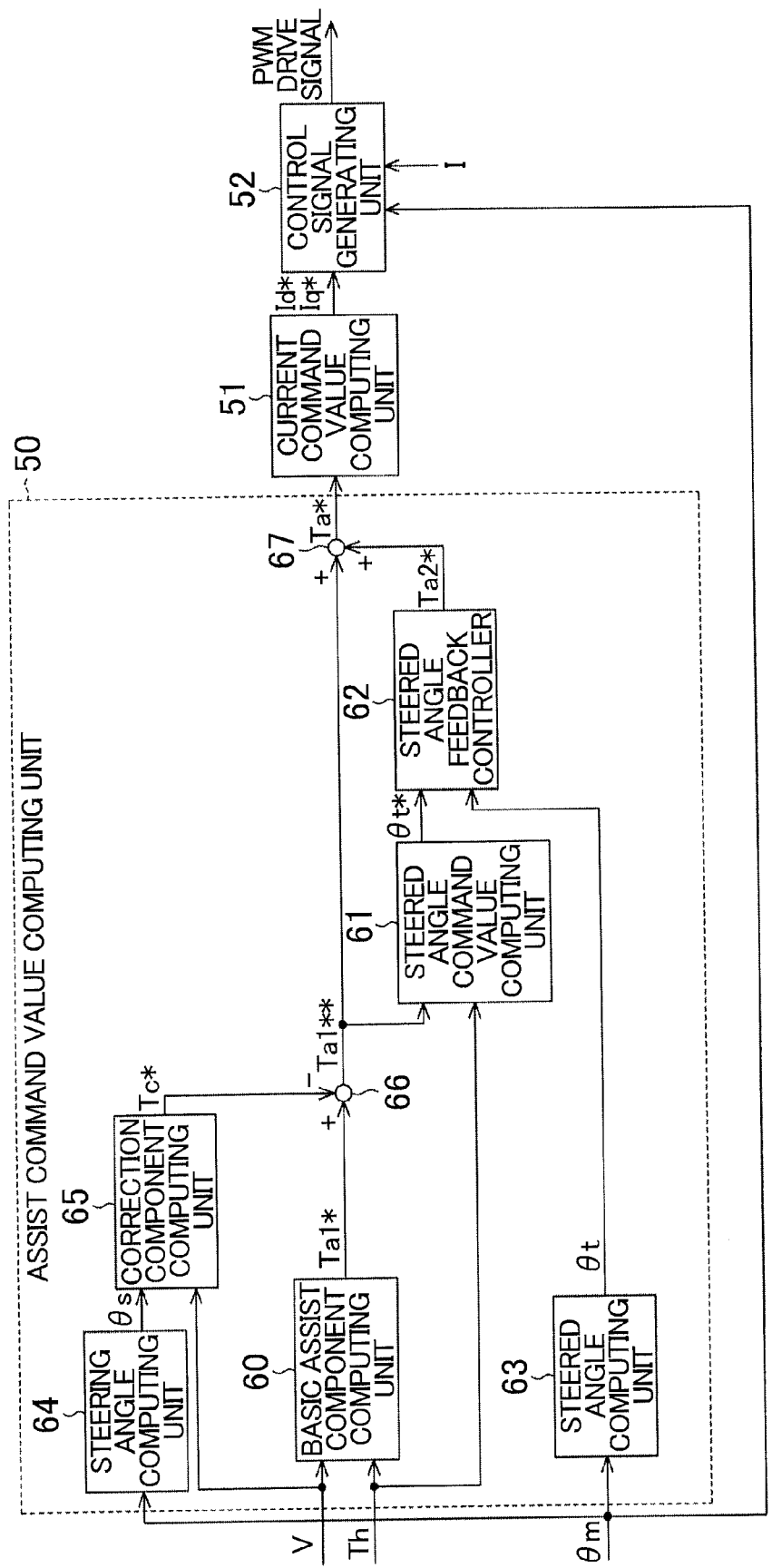
FIG. 3 is a control block diagram illustrating the configuration of the controller in the first embodiment.

Next, drive control of the motor 20, which is executed by the microcomputer 41, will be described in detail. As illustrated in FIG. 3, the microcomputer 41 includes an assist command value computing unit 50 that computes an assist command value Ta* based on the steering torque Th, the vehicle speed V, and the motor rotation angle θm. The assist command value Ta* corresponds to a target value of the torque output from the motor 20.

The assist command value computing unit 50 includes a basic assist component computing unit 60 that computes a first assist component Ta1* that is a basic component of the assist command value Ta*. The basic assist component computing unit 60 sets the absolute value of the first assist component Ta1* to a larger value as the absolute value of the steering torque Th is larger, or as the vehicle speed V is lower. The basic assist component computing unit 60 outputs the computed first assist component Ta1* to a subtractor 66. The subtractor 66 subtracts a correction component Tc*, which is computed by a correction component computing unit 65, from the first assist component Ta1* to correct the first assist component Ta1*. The subtractor 66 outputs a corrected first assist component Ta1** (=Ta1*−Tc*) to a steered angle command value computing unit 61 and an adder 67.

The steering torque Th, in addition to the corrected first assist component Ta1, is input into the steered angle command value computing unit 61. The sum of the corrected first assist component Ta1 and the steering torque Th is set as a basic drive torque. The steered angle command value computing unit 61 has an ideal model obtained by modeling a steered angle command value θt* corresponding to the basic drive torque. The steered angle command value θt* corresponds to a target value of the steered angle θt. The steered angle command value computing unit 61 computes the steered angle command value θt* based on the ideal model, and outputs the computed steered angle command value θt* to a steered angle feedback controller 62.

In the present embodiment, as illustrated in FIG. 1, the motor 20 is mechanically connected to the steering shaft 11 via the speed reducer 21, and thus there is a correlation between the motor rotation angle θm and the rotation angle of the steering shaft 11. Thus, there is also a correlation between the motor rotation angle θm and the steered angle θt of the steered wheels 3. As illustrated in FIG. 3, the assist command value computing unit 50 includes a steered angle computing unit 63 that computes the actual steered angle θt of the steered wheels 3 from the motor rotation angle θm with the use of these correlations. The steered angle computing unit 63 outputs the computed actual steered angle θt to the steered angle feedback controller 62.

The steered angle feedback controller 62 executes steered angle feedback control based on the deviation between the actual steered angle θt and the steered angle command value θt* such that the actual steered angle θt follows the steered angle command value θt*, thereby computing a second assist component Ta2*. The steered angle feedback controller 62 outputs the computed second assist component Ta2* to the adder 67. The adder 67 computes the assist command value Ta* (=Ta1**+Ta2*) by adding together the second assist component Ta2* and the corrected first assist component Ta1**, and then outputs the computed assist command value Ta* to a current command value computing unit 51.

The current command value computing unit 51 computes current command values Id*, Iq*. The current command values Id*, Iq* correspond to a target value of a drive current for the motor 20 in a d/q coordinate system. Specifically, the current command value computing unit 51 computes the current command value Iq* on a q-axis, based on the assist command value Ta*, and outputs the q-axis current command value Iq* to a control signal generating unit 52. In the present embodiment, the current command value Id* on a d-axis is set to zero, and the current command value computing unit 51 also outputs the d-axis current command value Id* to the control signal generating unit 52.

The three-phase current values I and the motor rotation angle θm, in addition to the d-axis current command value Id* and the q-axis current command value Iq* are input into the control signal generating unit 52. The control signal generating unit 52 maps the three-phase current values I on the d/q coordinate system based on the motor rotation angle θm, thereby computing the d-axis current command value and the q-axis current command value, which are actual current values of the motor 20 in the d/q coordinate system. The control signal generating unit 52 executes current feedback control based on the deviation between the d-axis current value and the d-axis current command value Id* and the deviation between the q-axis current value and the q-axis current command value Iq* such that the d-axis current value follows the d-axis current command value Id* and the q-axis current value follows the q-axis current command value Iq*, thereby generating a PWM drive signal. The PWM drive signal is output to the inverter circuit 40, and thus driving electric power corresponding to the PWM drive signal is supplied to the motor 20. Then, assist force corresponding to the assist command value Ta* is applied from the motor 20 to the steering shaft 11.

In this configuration, the assist command value Ta* contains the second assist component Ta2* obtained through the steered angle feedback control. Thus, when assist force corresponding to the assist command value Ta* is applied to the steering shaft 11, the actual steered angle θt follows the steered angle command value θt*. With the steered angle feedback control, even when friction is generated in the speed reducer 21 as the steering mechanism 1 is driven, the assist force is adjusted such that the actual steered angle θt follows the steered angle command value θt*. As a result, the assist force with which internal friction of the steering mechanism 1, the internal friction including the friction in the speed reducer 21, is cancelled out is applied to the steering mechanism 1. Thus, it is possible to eliminate a sense of friction that a driver will actually feel while operating the steering wheel 10 at a position near the neutral position.

In the present embodiment, a sense of friction that a driver will actually feel while operating the steering wheel 10 at a position near the neutral position is eliminated, and the assist force is further adjusted so that an ideal steering feel is obtained. In this way, the steering feel is improved. Next, description will be provided on the configuration for adjusting the assist force such that an ideal steering feel is obtained.

As illustrated in FIG. 3, the assist command value computing unit 50 includes a steering angle computing unit 64 that computes an actual steering angle θs of the steering wheel 10 based on the motor rotation angle θm. The steering angle computing unit 64 computes the steering angle θs with the use of a correlation between the motor rotation angle θm and the rotation angle of the steering shaft 11. In the present embodiment, when the steering wheel 10 is at the neutral position, the steering angle θs is zero degrees. The steering angle θs is defined such that, when the steering wheel 10 is turned to the right (in the right steering direction), the steering angle θs increases, whereas when the steering wheel 10 is turned to the left (in the left steering direction), the steering angle θs decreases. The steering angle computing unit 64 outputs the computed steering angle θs to the correction component computing unit 65.

The correction component computing unit 65 computes the correction component Tc* based on the steering angle θs, and outputs the computed correction component Tc* to the subtractor 66. The subtractor 66 subtracts the correction component Tc* from the first assist component Ta1*. When the correction component Tc* is subtracted from the first assist component Ta1*, the assist command value Ta* is decreased by an amount corresponding to the correction component Tc*. Thus, the assist force applied to the steering shaft 11 is decreased by an amount corresponding to the correction component Tc*. Thus, the steering torque Th required to operate the steering wheel 10 is increased by an amount corresponding to the correction component Tc*. As a result, it is possible to give a driver a steering feel corresponding to the correction component Tc*.

The steering feel felt by a driver varies depending on whether the driver performs a turning operation of the steering wheel 10 (operation for increasing the absolute value of the steering angle θs of the steering wheel 10) or a returning operation of the steering wheel 10 (operation for decreasing the absolute value of the steering angle θs of the steering wheel 10). In consideration of such variations in the driver's steering feel, the correction component computing unit 65 computes a first correction component corresponding to the returning operation, and a second correction component corresponding to the turning operation individually, and obtains the correction component Tc* by combining together the first and second correction components.

Figure 4:
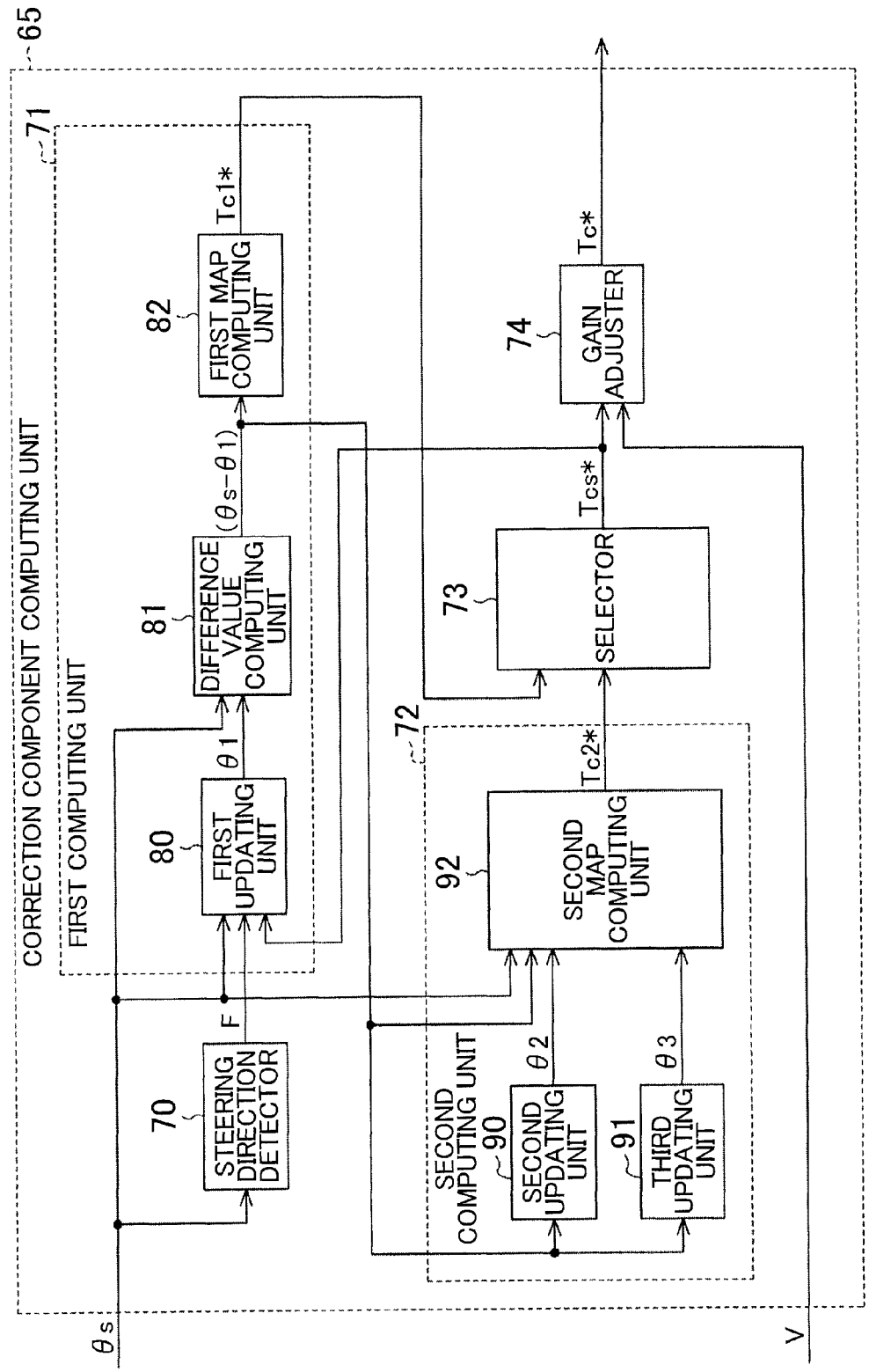
FIG. 4 is a control block diagram illustrating the configuration of a correction component computing unit in the first embodiment.

Specifically, as illustrated in FIG. 4, the correction component computing unit 65 includes a steering direction detector 70 that detects a steering direction; a first computing unit 71 that computes a first correction component Tc1* corresponding to the returning operation; and a second computing unit 72 that computes a second correction component Tc2* corresponding to the turning operation. The correction component computing unit 65 includes a selector 73 that selects one of the first correction component Tc1* and the second correction component Tc2*, which are respectively computed by the computing units 71, 72, and a gain adjuster 74 that obtains the correction component Tc* by adjusting a gain of a correction component Tcs* (hereinafter, referred to as "selected correction component") selected by the selector 73, based on the vehicle speed V.

The steering direction detector 70 detects a steering direction of the steering wheel 10 based on a temporal change in the steering angle θs. When the detected steering direction is the right steering direction, the steering direction detector 70 sets the value of a flag F to one (1), whereas when the detected steering direction is the left steering direction, the steering direction detector 70 sets value of the flag F to minus one (−1). The steering direction detector 70 outputs the set value of the flag F to the first computing unit 71.

Figure 5:
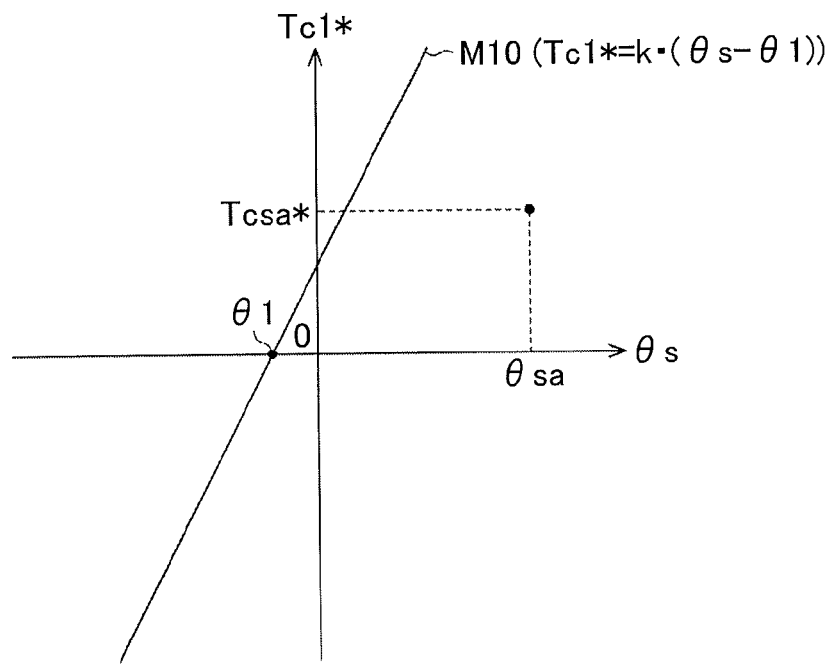
FIG. 5 is a graph illustrating an example of a returning operation map of the correction component computing unit in the first embodiment.

The steering angle θs and the selected correction component Tcs*, in addition to the flag F, are input into the first computing unit 71. The first computing unit 71 has a returning operation map M10 that indicates a relationship between the steering angle θs and the first correction component Tc1* as illustrated in FIG. 5. As illustrated in FIG. 5, in the returning operation map M10, when the steering angle θs is a first reference angle θ1, the first correction component Tc1* is zero, and the first correction component Tc1* is set to be proportional to the steering angle θs.

That is, the returning operation map M10 is defined by Expression (1) indicated below. In Expression (1), k indicates a proportional constant.

$$Tc1^* = k \cdot (\theta s - \theta 1) \quad (1)$$

The first computing unit 71 computes the first correction component Tc1* from the steering angle θs based on the returning operation map M10 illustrated in FIG. 5.

As illustrated in FIG. 4, the first computing unit 71 includes a first updating unit 80 that updates the first reference angle θ1 based on the steering angle θs, the flag F, and the selected correction component Tcs*. Every time first updating unit 80 acquires the value of the flag F in a prescribed cycle, the first updating unit 80 compares the present value and the immediately preceding value of the flag F with each other and determines whether the present value and the immediately preceding value of the flag F differ from each other. The present value indicates a value in the present control cycle, and the immediately preceding value indicates a value in the immediately preceding control cycle. When the present value and the immediately preceding value of the flag F coincide with each other, that is, when the steering direction remains unchanged, the first updating unit 80 outputs the immediately preceding value of the first reference angle θ1, as it is, to a difference value computing unit 81. On the other hand, when the present value and the immediately preceding value of the flag F differ from each other, that is, when the steering direction is reversed, the first updating unit 80 computes a new first reference angle θ1 by substituting the immediately preceding value of the selected correction component Tcs* and the immediately preceding value of the steering angle θs respectively for Tc1* and θs in Expression (1). The first updating unit 80 outputs the new first reference angle θ1 to the difference value computing unit 81.

The steering angle θs, in addition to the first reference angle θ1, is input into the difference value computing unit 81. The difference value computing unit 81 obtains a difference value (θs−θ1) by subtracting the first reference angle θ1 from the steering angle θs. The difference value computing unit 81 outputs the difference value to the second computing unit 72 and a first map computing unit 82. The first map computing unit 82 computes the first correction component Tc1* by multiplying the difference value (θs−θ1) by the proportional constant k, and outputs the computed result to the selector 73.

Figure 6:
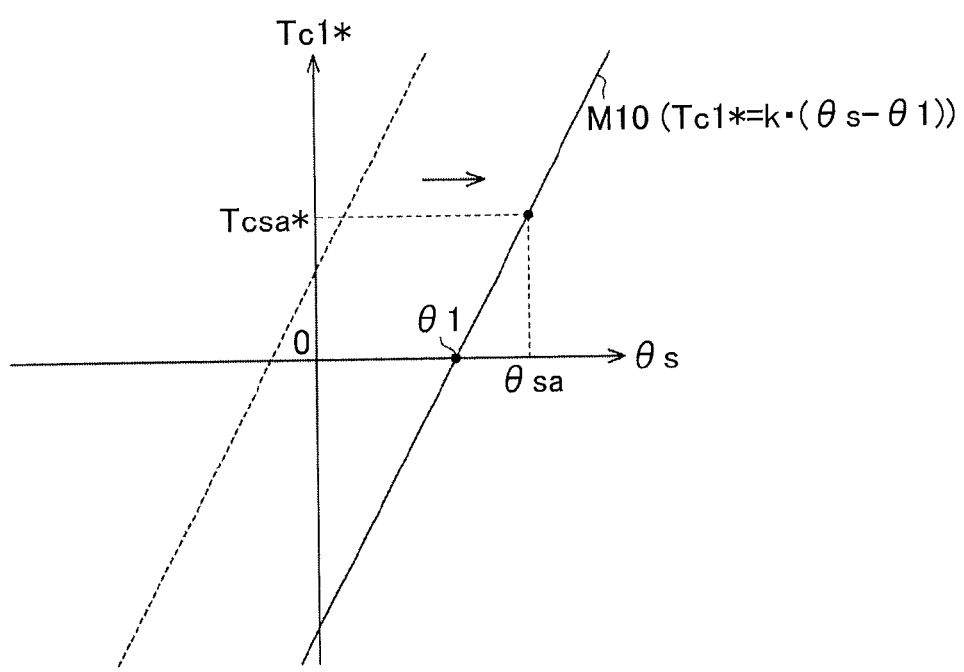
FIG. 6 is a graph illustrating the manner of a change in the returning operation map.

When the first computing unit 71 configured as described above is computing the first correction component Tc1* based on the returning operation map M10 illustrated in, for example, FIG. 5, unless the steering direction reversed, the first computing unit 71 keeps computing the first correction component Tc1* based on the returning operation map M10 illustrated in FIG. 5. When the steering direction is reversed, and at this time, the immediately preceding values of the steering angle θs and the selected correction component Tcs* are respectively θsa and Tcsa* illustrated in FIG. 5, the returning operation map M10 is updated to a new map that passes through a coordinate point (θsa, Tcsa*) illustrated in FIG. 6.

Figure 7:
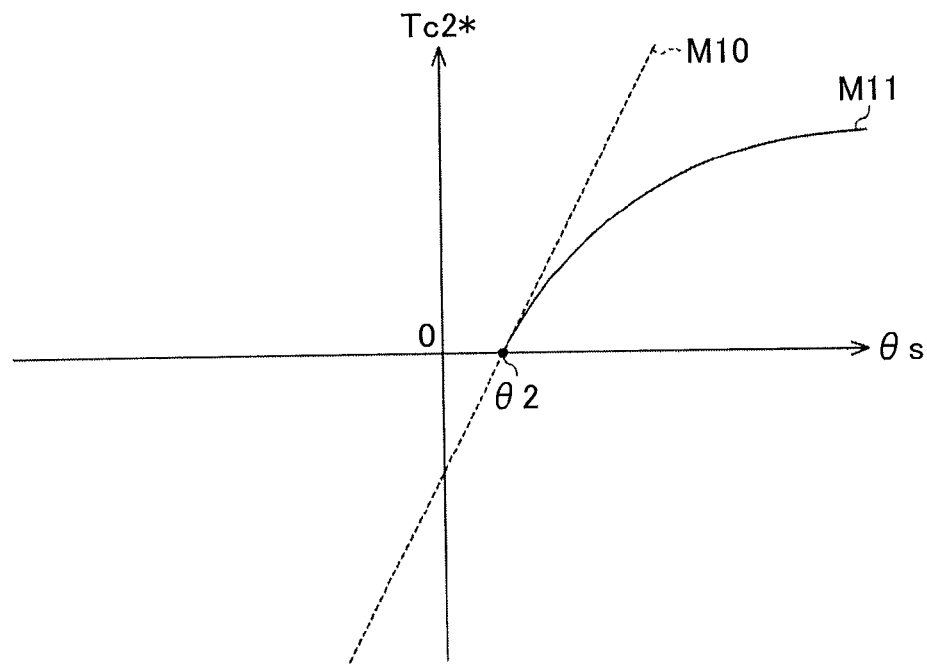
FIG. 7 is a graph illustrating an example of a first turning operation map of the correction component computing unit in the first embodiment.
Figure 8:
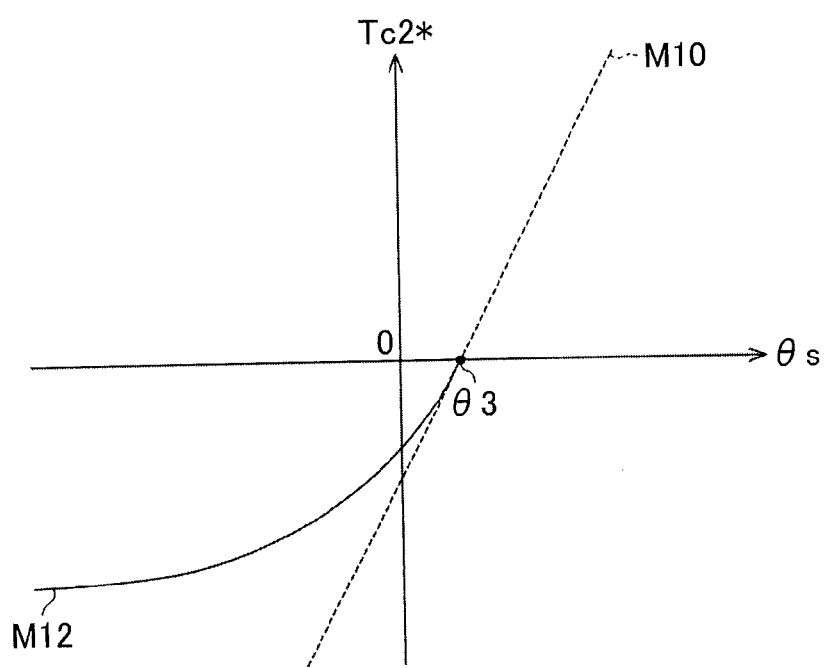
FIG. 8 is a graph illustrating an example of a second turning operation map of the correction component computing unit in the first embodiment.

The second computing unit 72 has two turning operation maps M11, M12, each of which indicates a relationship between the steering angle θs and the second correction component Tc2* as illustrated in FIG. 7 and FIG. 8. As illustrated in FIG. 7, in the first turning operation map M11, when the steering angle θs is a second reference angle θ2, the second correction component Tc2* is zero. In the first turning operation map M11, as the steering angle θs increases from the second reference angle θ2, that is, as the steering angle θs changes from the second reference angle θ2 in the right steering direction, the second correction component Tc2* increases. In the first turning operation map M11, as the steering angle θs increases, the absolute value of a rate of change in the second correction component Tc2* with respect to the steering angle θs (gradient of the map M11) decreases. The returning operation map M10 is indicated by a broke line in FIG. 7. As illustrated in FIG. 7, the absolute value of a rate of change in the first turning operation map M11 is set to a value smaller than the absolute value of a rate of change in the returning operation map M10.

As illustrated in FIG. 8, in the second turning operation map M12, when the steering angle θs is a third reference angle θ3, the second correction component Tc2* is zero. In the second turning operation map M12, as the steering angle θs decreases from the third reference angle θ3, that is, as the steering angle θs changes from the second reference angle θ2 in the left steering direction, the second correction component Tc2* decreases. In the second turning operation map M12, as the steering angle θs decreases, the absolute value of a rate of change in the second correction component Tc2* with respect to the steering angle θs (gradient of the map M12) decreases. The returning operation map M10 is indicated by a broke line in FIG. 8. The absolute value of a rate of change in the second turning operation map M12 is also set to a value smaller than the absolute value of a rate of change in the returning operation map M10.

The second computing unit 72 computes the second correction component Tc2* from the steering angle θs, based on the two turning operation maps M11, M12. Specifically, as illustrated in FIG. 4, the difference value (θs−θ1) computed by the first computing unit 71, and the steering angle θs are input into the second computing unit 72. The second computing unit 72 includes a second updating unit 90 and a third updating unit 91 that respectively update the second reference angle θ2 and the third reference angle θ3 based on the difference value (θs−θ1).

Every time the second updating unit 90 receives the difference value (θs−θ1) in a prescribed control cycle, the second updating unit 90 compares the present value and the immediately preceding value of the difference value (θs−θ1) with each other, and determines whether the sign of the difference value (θs−θ1) changes. When the sign of the difference value (θs−θ1) changes from the negative sign to the positive sign, the second updating unit 90 sets the second reference angle θ2 to the same value as the first reference angle θ1 at this time, and outputs the newly set second reference angle θ2 to a second map computing unit 92. On the other hand, when the sign of the difference value (θs−θ1) does not change from the negative sign to the positive sign, the second updating unit 90 outputs the immediately preceding value of the second reference angle θ2, as it is, to the second map computing unit 92.

Every time the third updating unit 91 receives the difference value (θs−θ1) at a prescribed control cycle, the third updating unit 91 compares the present value and the immediately preceding value of the difference value (θs−θ1) with each other, and determines whether the sign of the difference value (θs−θ1) changes. When the sign of the difference value (θs−θ1) changes from the positive sign to the negative sign, the third updating unit 91 sets the third reference angle θ3 to the same value as the first reference angle θ1 at this time, and outputs the newly set third reference angle θ3 to the second map computing unit 92. On the other hand, when the sign of the difference value (θs−θ1) does not change from the positive sign to the negative sign, the third updating unit 91 outputs the immediately preceding value of the third reference angle θ3, as it is, to the second map computing unit 92.

The steering angle θs and the difference value (θs−θ1), in addition to the second reference angle θ2 and the third reference angle θ3, are input into the second map computing unit 92. The second map computing unit 92 has the two turning operation maps M11, M12 illustrated in FIG. 7 and FIG. 8. The second map computing unit 92 computes the second correction component Tc2* as explained in the following descriptions (a1), (a2), based on the difference value (θs−θ1).

(a1) When the difference value (θs−θ1) is larger than or equal to zero (θs−θ1≥0), that is, when the steering angle θs is larger than or equal to the first reference angle θ1, the second map computing unit 92 computes the second correction component Tc2* from the second reference angle θ2 and the steering angle θs, based on the first turning operation map M11 illustrated in FIG. 7.

(a2) When the difference value (θs−θ1) is smaller than zero (θs−θ1<0), that is, when the steering angle θs is smaller than the first reference angle θ1, the second map computing unit 92 computes the second correction component Tc2* from the third reference angle θ3 and the steering angle θs, based on the second turning operation map M12 illustrated in FIG. 8.

The second map computing unit 92 outputs the computed second correction component Tc2* to the selector 73. The selector 73 selects a correction component having a smaller absolute value among the first correction component Tc1* and the second correction component Tc2*, and outputs the selected correction component Tcs* to the gain adjuster 74.

The vehicle speed V, in addition to the selected correction component Tcs*, is input into the gain adjuster 74. The gain adjuster 74 adjusts an amplification factor (gain) of the selected correction component Tcs* to a larger value as the vehicle speed V becomes higher. The gain adjuster 74 outputs the selected correction component Tcs* that has been adjusted, as the correction component Tc*.

With reference to FIG. 9 to FIG. 13, a manner of setting the correction component Tc* based on a change in the steering angle θs will be described, and the operation of the electric power steering system according to the present embodiment will be described. Note that, in an initial state, each of all the first to third reference angles θ1 to θ3 is set to zero degrees. The gain set by the gain adjuster 74 is one. That is, the selected correction component Tcs* is the same as the correction component Tc*. The returning operation map M10 is indicated by a broken line, the first turning operation map M11 is indicated by an alternate long and short dash line, and the second turning operation map M12 is indicated by a two-dot chain line.

Figure 9:
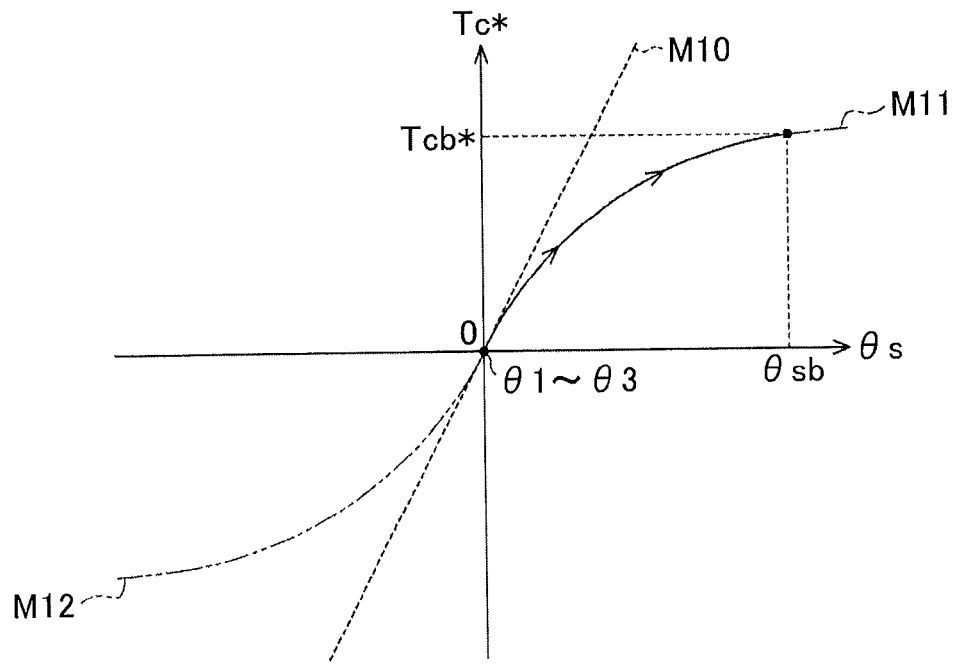
FIG. 9 is a graph illustrating the manner of computing a correction component based on a change in the steering angle in the first embodiment.

For example, when a driver turns the steering wheel 10 from the neutral position in the right steering direction and thus the steering angle θs increases gradually from zero degrees, the first computing unit 71 computes the first correction component Tc1* based on the returning operation map M10 illustrated in FIG. 9. Because the difference value (θs−θ1) is larger than or equal to zero (θs−θ1≥0), the second computing unit 72 computes the second correction component Tc2* based on the first turning operation map M11 illustrated in FIG. 9. At this time, because the absolute value |Tc2*| of the second correction component Tc2* is smaller than the absolute value |Tc1*| of the first correction component Tc1* on the basis of the relationship between the gradients of the maps M10, M11, the selector 73 selects the second correction component Tc2*. As a result, the correction component Tc* changes in a manner corresponding to the first turning operation map M11 as indicated by the continuous line with arrows in FIG. 9.

Figure 10:
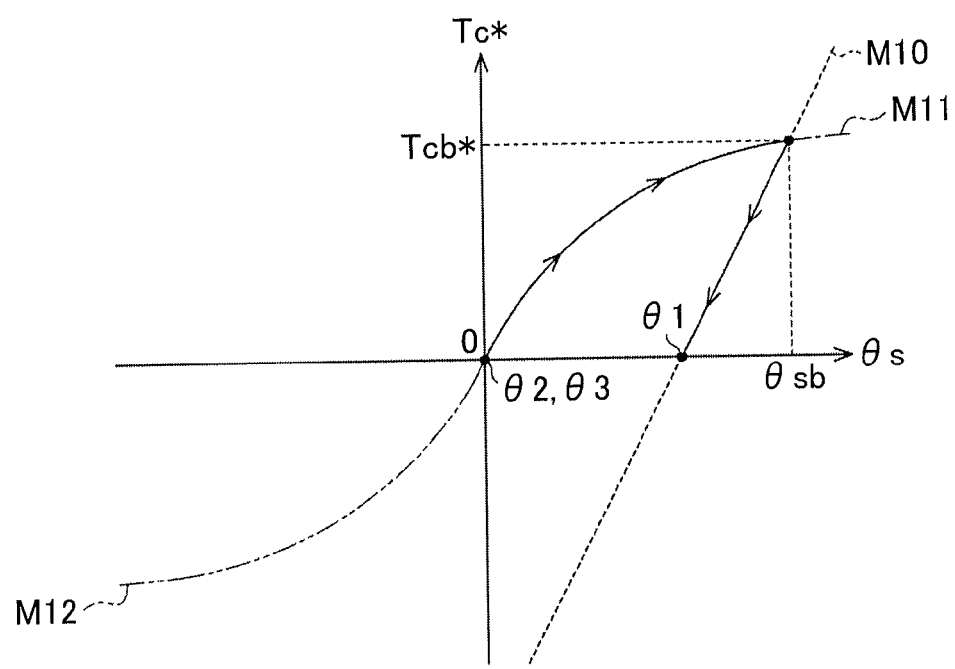
FIG. 10 is a graph illustrating the manner of computing a correction component based on a change in the steering angle in the first embodiment.

Then, the driver turns the steering wheel 10 in the left steering direction at a steering angle θsb, and thus the steering direction of the steering wheel 10 is reversed. At this time, as illustrated in FIG. 10, the first updating unit 80 updates the first reference angle θ1 based on the steering angle θsb and a correction component Tcb* corresponding to the steering angle θsb, and moves the returning operation map M10 such that the returning operation map M10 passes through a coordinate point (θsb, Tcb*). Thus, the absolute value |Tc1*| of the first correction component Tc1* computed based on the returning operation map M10 is smaller than the absolute value |Tc2*| of the second correction component Tc2* computed based on the first turning operation map M11. Thus, the selector 73 selects the first correction component Tc1*. As a result, the correction component Tc* changes in a manner corresponding to the returning operation map M10 as indicated by the continuous line with arrows in FIG. 10.

Figure 11:
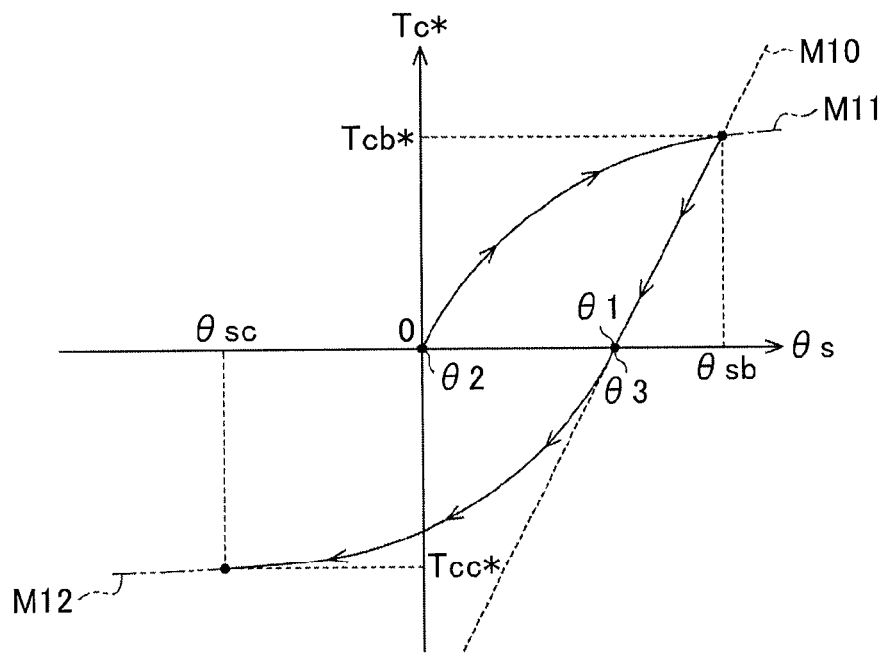
FIG. 11 is a graph illustrating the manner of computing a correction component based on a change in the steering angle in the first embodiment.

When the driver further operates the steering wheel 10 beyond the first reference angle θ1, the sign of the difference value (θs−θ1) changes from the positive sign to the negative sign. Thus, the third updating unit 91 sets the third reference angle θ3 to the same value as the first reference angle θ1. As a result, the second turning operation map M12 moves as illustrated in FIG. 11. After this, because the difference value (θs−θ1) is smaller than zero (θs−θ1<0), the second computing unit 72 switches the map from the first turning operation map M11 to the second turning operation map M12, and computes the second correction component Tc2*. At this time, due to the relationship between the gradients of the returning operation map M10 and the second turning operation map M12, the absolute value |Tc2*| of the second correction component Tc2* computed based on the second turning operation map M12 is smaller than the absolute value |Tc1*| of the first correction component Tc1* computed based on the returning operation map M10. Thus, the selector 73 selects the second correction component Tc2*. As a result, the correction component Tc* changes in a manner corresponding to the second turning operation map M12 as indicated by the continuous line with arrows in FIG. 11.

Figure 12:
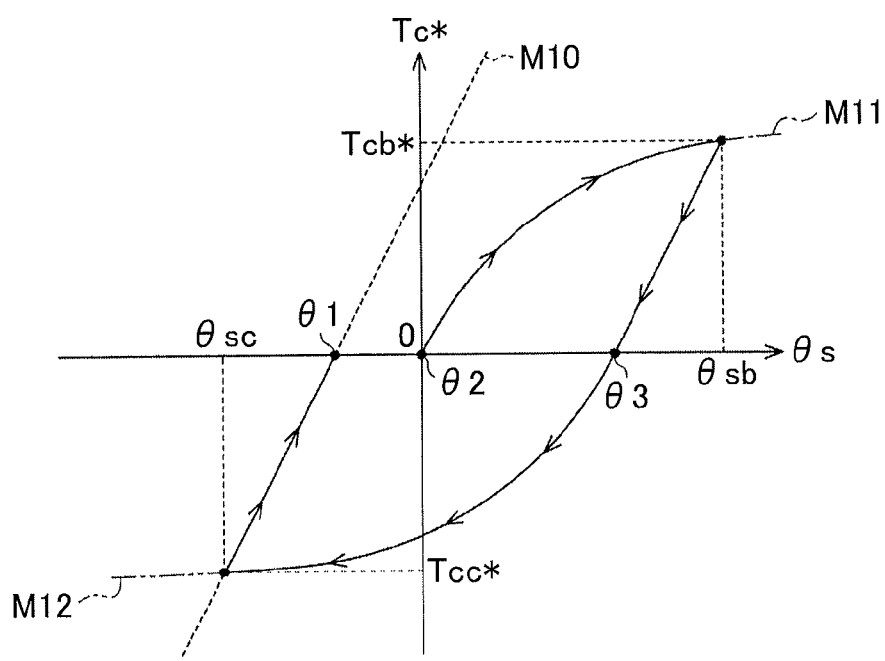
FIG. 12 is a graph illustrating the manner of computing a correction component based on a change in the steering angle in the first embodiment.

Then, the driver turns the steering wheel 10 in the right steering direction at a steering angle θsc, and thus the steering direction of the steering wheel 10 is reversed. At this time, as illustrated in FIG. 12, the first updating unit 80 updates the first reference angle θ1 based on the steering angle θsc and a correction component Tcc* corresponding to the steering angle θsc, and moves the returning operation map M10 such that the returning operation map M10 passes through a coordinate point (θsc, Tcc*). Thus, the absolute value |Tc1*| of the first correction component Tc1* computed based on the returning operation map M10 is smaller than the absolute value |Tc2*| of the second correction component Tc2* computed based on the second turning operation map M12. Thus, the selector 73 selects the first correction component Tc1*. As a result, the correction component Tc* changes in a manner corresponding to the returning operation map M10 as indicated by the continuous line with arrows in FIG. 12.

When the driver further operates the steering wheel 10 beyond the first reference angle θ1, the sign of the difference value (θs−θ1) changes from the negative sign to the positive sign. Thus, the second updating unit 90 sets the second reference angle θ2 to the same value as the first reference angle θ1. Thus, the first turning operation map M11 moves as illustrated in FIG. 13. After this, because the difference value (θs−θ1) is larger than or equal to zero (θs−θ1≥0), the second computing unit 72 switches the map from the second turning operation map M12 to the first turning operation map M11, and computes the second correction component Tc2*. At this time, due to the relationship between the gradients of the returning operation map M10 and the first turning operation map M11, the absolute value |Tc2*| of the second correction component Tc2* computed based on the first turning operation map M11 is smaller than the absolute value |Tc1*| of the first correction component Tc1* computed based on the returning operation map M10. Thus, the selector 73 selects the second correction component Tc2*. As a result, the correction component Tc* changes in a manner corresponding to the first turning operation map M11 as indicated by the continuous line with arrows in FIG. 13.

After this, the correction component computing unit 65 repeatedly executes the same processes. With this configuration, because the correction component Tc* has hysteresis characteristics as illustrated in FIG. 13, with respect to the steering angle θs, it is possible to give the driver a steering feel having hysteresis characteristics with respect to a change in the steering angle θs. Further, it is possible to change hysteresis characteristics by changing the shape of each of the maps M10 to M12 as needed. Thus, it is possible to change a steering feel felt by the driver as necessary.

As described above, the electric power steering system according to the present embodiment produces the following advantageous effects. The assist command value Ta* contains the second assist component Ta2* that is obtained by executing the steered angle feedback control, and the correction component Tc* having hysteresis characteristics with respect to a change in the steering angle θs of the steering wheel 10. Thus, it is possible to eliminate a sense of friction that a driver will feel while operating the steering wheel 10 at a position near the neutral position, and then give the driver a desired steering feel. As a result, it is possible to improve the steering feel. Even when the driver is operating the steering wheel 10 at positions other than the positions near the neutral position, it is possible to give the driver a desired steering feel. As a result, it is possible to improve the steering feel.

It is possible to set a steering feel at the time of a turning operation and a steering feel at the time of a returning operation individually by adjusting the returning operation map M10 and the turning operation maps M11, M12 individually. Thus, it becomes easier to adjust the steering feel.

As the maps for computing the correction component Tc*, the returning operation map M10 illustrated in FIG. 5 and the two turning operation maps M11, M12 respectively illustrated in FIG. 7 and FIG. 8 are used. Accordingly, it is possible to easily compute the correction component Tc* having hysteresis characteristics with respect to the steering angle θs.

When the direction in which steering angle θs changes is reversed, the returning operation map M10 is updated to a map that may take the selected correction component Tcs* and the steering angle θs at this time. Thus, when the direction in which steering angle θs changes is reversed, it is possible to immediately switch the map for computing the correction component Tc* to the returning operation map M10. As a result, it is possible to give the driver a steering feel corresponding to the returning operation map M10.

Because the returning operation map M10 is continuous with one of the two turning operation maps M11, M12 at the first reference angle θ1, it is possible to switch the map for computing the correction component Tc* from the returning operation map M10 to one of the two turning operation maps M11, M12 when the steering angle θs reaches the first reference angle θ1. Thus, it is possible to give the driver a steering feel corresponding to one of the two turning operation maps M11, M12 when the steering angle θs reaches the first reference angle θ1.

The correction component computing unit 65 is provided with the gain adjuster 74 that changes the amplification factor of the correction component Tc* based on the vehicle speed V. Because the steering feel changes based on the vehicle speed V, it is possible to obtain a better steering feel based on the travelling state of the vehicle.

Figure 14:
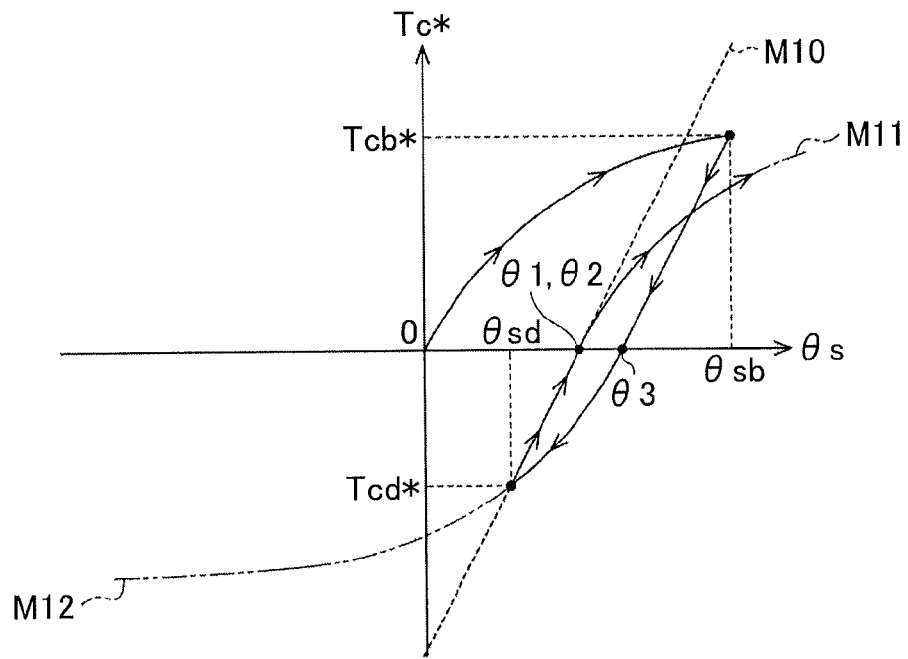
FIG. 14 is a graph illustrating the manner of computing a correction component based on a change in the steering angle in the first embodiment.

Next, a first modified example of the first embodiment will be described. In the electric power steering system of the first embodiment, when the steering direction of the steering wheel 10 is reversed while the correction component computing unit 65 is computing the correction component Tc* with the use of the second turning operation map M12, the correction component computing unit 65 computes the correction component Tc* as illustrated in FIG. 14. That is, the first updating unit 80 updates the first reference angle θ1 based on a steering angle θsd at the time when the steering direction of the steering wheel 10 is changed and a correction component Tcd* corresponding to the steering angle θsd, and moves the returning operation map M10 such that the returning operation map M10 passes through a coordinate point (θsd, Tcd*). Thus, the correction component computing unit 65 computes the correction component Tc* based on the returning operation map M10 as indicated by the arrows in FIG. 14. Then, when the driver operates the steering wheel 10 beyond the first reference angle θ1, the sign of the difference value (θs−θ1) changes from the negative sign to the positive sign. Thus, the second updating unit 90 sets the second reference angle θ2 to the same value as the first reference angle θ1. Thus, the correction component computing unit 65 computes the correction component Tc* based on the first turning operation map M11 as indicated by the arrows in FIG. 14.

In the case where the correction component Tc* is computed in this manner, when the driver operates the steering wheel 10 to the first reference angle θ1, the rate of change in the correction component Tc* with respect to the steering angle θs is decreased. Thus, the steering response felt by the driver's hands is reduced. This may give an uncomfortable feeling to the driver.

Figure 15:
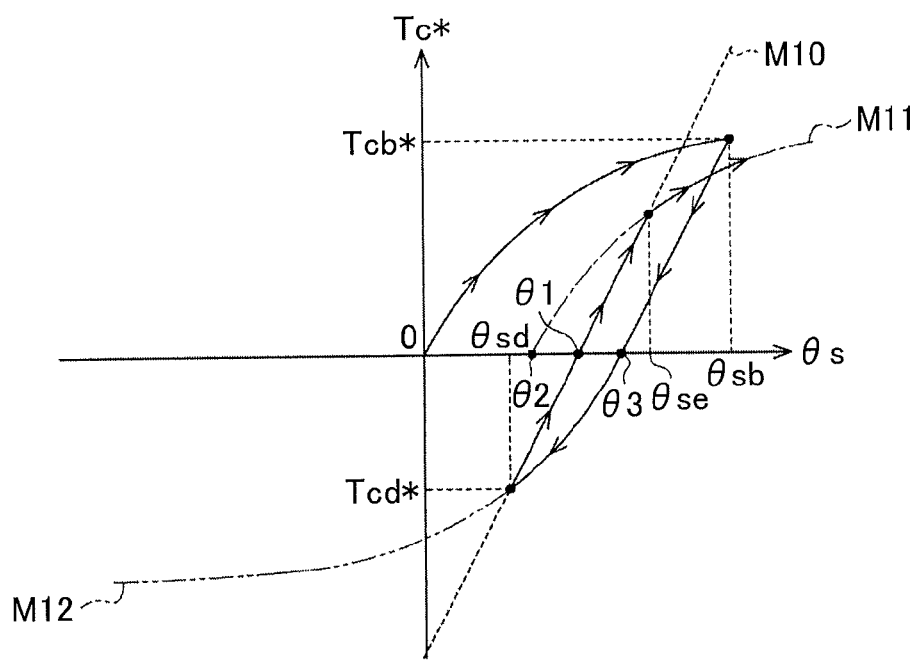
FIG. 15 is a graph illustrating the manner of computing a correction component based on a change in the steering angle in a first modified example of the first embodiment.

In this modified example, as illustrated in FIG. 15, when the sign of the difference value (θs−θ1) changes from the negative sign to the positive sign, the second updating unit 90 sets the second reference angle θ2 to a value smaller than the first reference angle θ1. With this configuration, until the steering wheel 10 is operated to a steering angle θse at which the returning operation map M10 and the first turning operation map M11 intersect with each other, the correction component Tc* is computed based on the returning operation map M10 and thus the rate of change in the correction component Tc* with respect to the steering angle θs is maintained. As a result, it is possible to prolong a period in which appropriate steering response felt by the driver's hands is ensured, based on the driver's preference.

Similarly, when the sign of the difference value (θs−θ1) changes from the positive sign to the negative sign, the third updating unit 91 also may set the third reference angle θ3 to a value larger than the first reference angle θ1.

Figure 16:
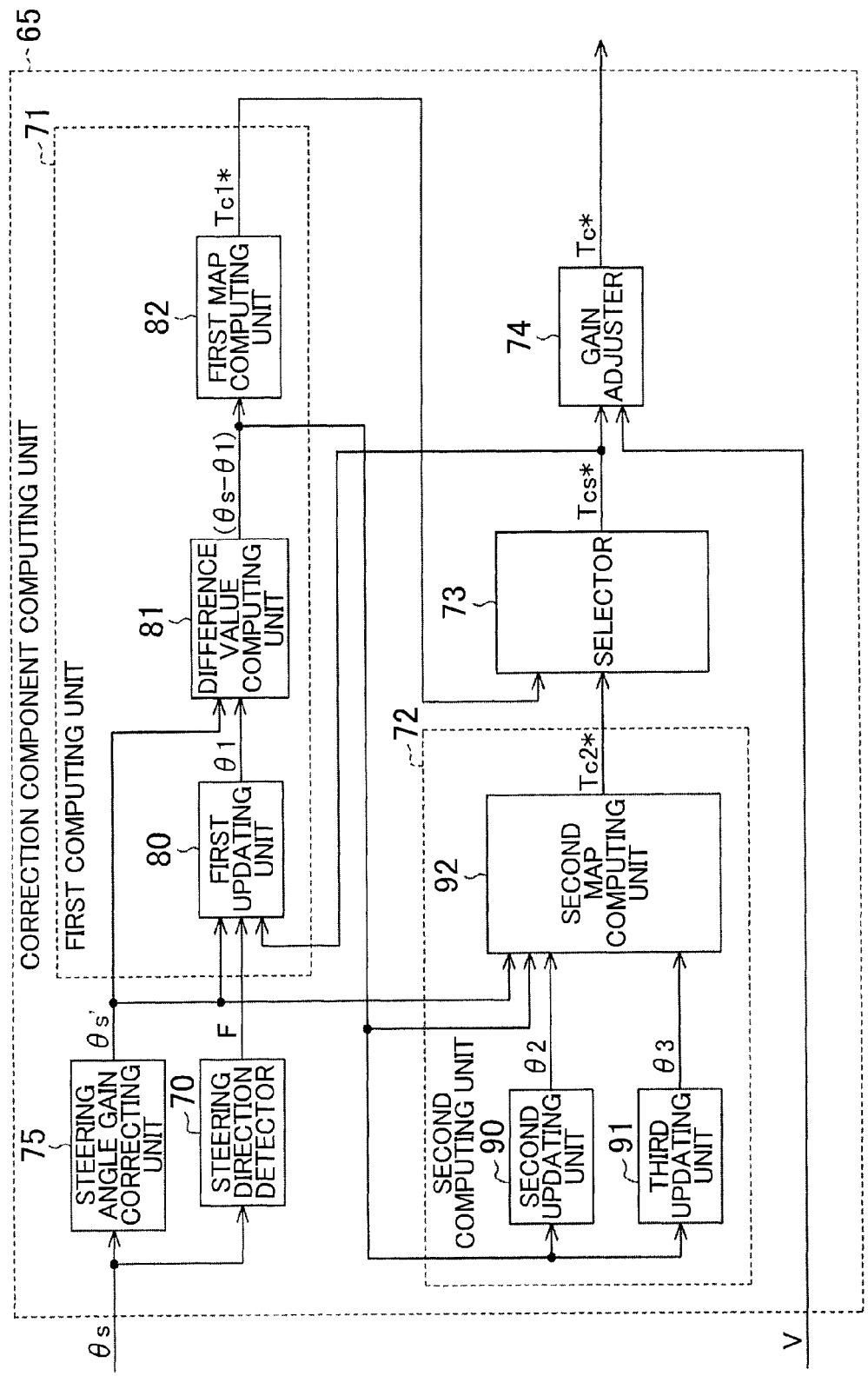
FIG. 16 is a control block diagram illustrating the configuration of a correction component computing unit in a second modified example of the first embodiment.
Figure 17:
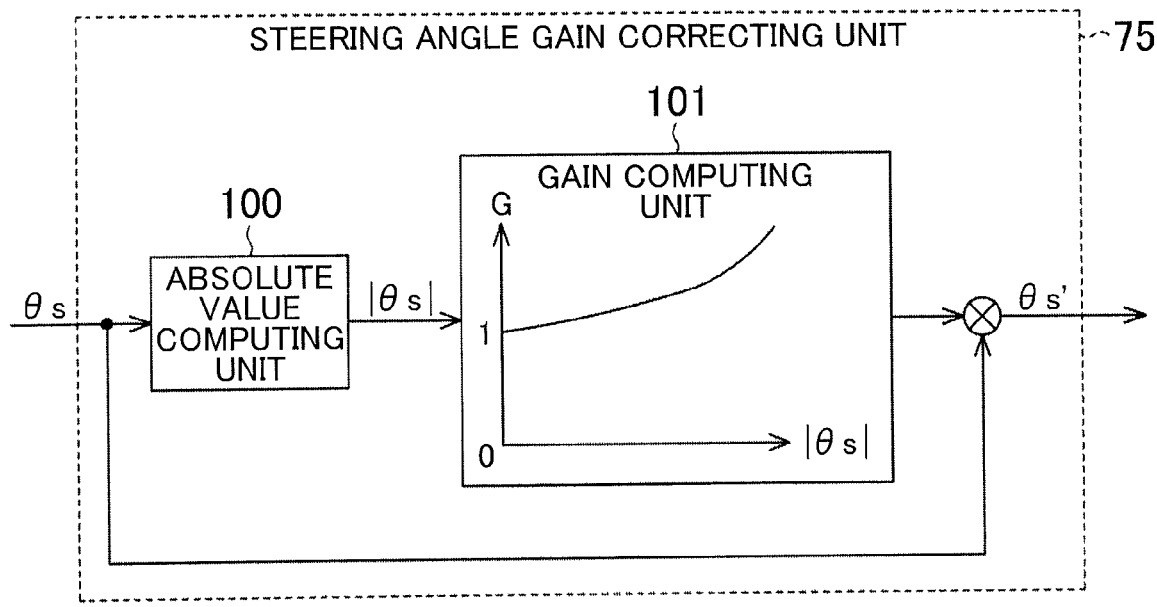
FIG. 17 is a control block diagram illustrating the configuration of a steering angle gain correcting unit in the second modified example of the first embodiment.

Next, a second modified example of the first embodiment will be described. As illustrated in FIG. 16, in this modified example, the correction component computing unit 65 is provided with a steering angle gain correcting unit 75 that corrects a gain of the steering angle θs used for computation in the first computing unit 71 and the second computing unit 72. As illustrated in FIG. 17, the steering angle gain correcting unit 75 includes an absolute value computing unit 100 that computes the absolute value |θs| of the steering angle, and a gain computing unit 101 that computes a gain G (>one) based on the computed absolute value. As the absolute value |θs| of the steering angle increases, the gain computing unit 101 sets the gain G to a larger value. A steering angle θs' for computation (hereinafter, referred to as "computation steering angle θs'") is obtained by multiplying the steering angle θs by the gain G computed by the gain computing unit 101. As illustrated in FIG. 16, the steering angle gain correcting unit 75 outputs the obtained computation steering angle θs' to the computing units 71, 72.

Figure 18:
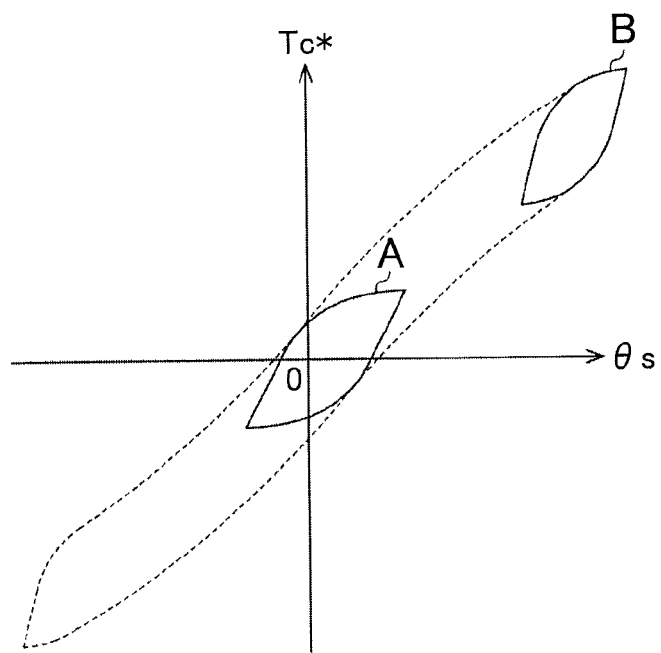
FIG. 18 is a graph illustrating a locus of change in the correction component with respect to the steering angle in the second modified example of the first embodiment.

With this configuration, as the gain G increases, the computation steering angle θs' input into the computing units 71, 72 changes by a larger amount, and thus the first correction component Tc1* and the second correction component Tc2* computed, respectively, by the computing units 71, 72 also change by a larger amount. As a result, as illustrated in FIG. 18, the rate of change in the correction component Tc* with respect to the steering angle θs is higher in a locus B of change in the correction component Tc* at the time when the steering wheel 10 is at a position apart from the neutral position than in a locus A of change in the correction component Tc* at the time when the steering wheel 10 is positioned near the neutral position. That is, the rate of change in the assist force with respect to the steering angle θs is higher and thus the steering response felt by the driver's hands during a steering operation is higher when the steering wheel 10 is at a position apart from the neutral position than when the steering wheel 10 is positioned near the neutral position. Thus, it is possible to obtain a better steering feel corresponding to the driver's steering operation.

Next, an electric power steering system according to a second embodiment of the invention will be described. Mainly, the difference from the first embodiment will be described below.

When the driver turns the steering wheel 10 from the neutral position, and then takes his/her hands off the steering wheel 10, the steering torque Th becomes zero and thus the first assist component Ta1* set based on the steering torque Th is basically set to zero. In this case, the assist command value Ta* is determined by the second assist component Ta2* and the correction component Tc*. For example, when each of both the steering torque Th and the first assist component Ta1* is set to zero, if the correction component Tc* is zero, the steered angle command value computing unit 61 sets the steered angle command value θt* to zero degrees. Thus, the steered angle feedback controller 62 computes the second correction component Ta2* at which the steered angle θt is brought to zero degrees. As a result, it is possible to return the steering wheel 10 to the neutral position by using the assist force corresponding to the second assist component Ta2*. However, when the correction component Tc* has hysteresis characteristics with respect to the steering angle θs as illustrated in FIG. 13, the correction component Tc* does not become zero in a region in which the steering angle θs is close to zero degrees, that is, in a region in which the steering wheel 10 is positioned near the neutral position. In this case, the corrected first assist component Ta1** is a value obtained by assigning the negative sign to the correction component Tc* which is not zero, and the assist force corresponding to the corrected first assist component Ta1 is applied to the steering mechanism 1. Thus, the assist force becomes zero at a position at which the assist force corresponding to the corrected first assist component Ta1 and the assist force corresponding to the second assist component Ta2* are balanced with each other. As a result, the steering wheel 10 may stop at a position offset from the neutral position.

In the present embodiment, when the fact that the driver takes his/her hands off the steering wheel 10 is detected, the correction component Tc* is adjusted to zero, and thus the steering wheel 10 is returned to the neutral position. This control will be described in detail below.

Figure 19:
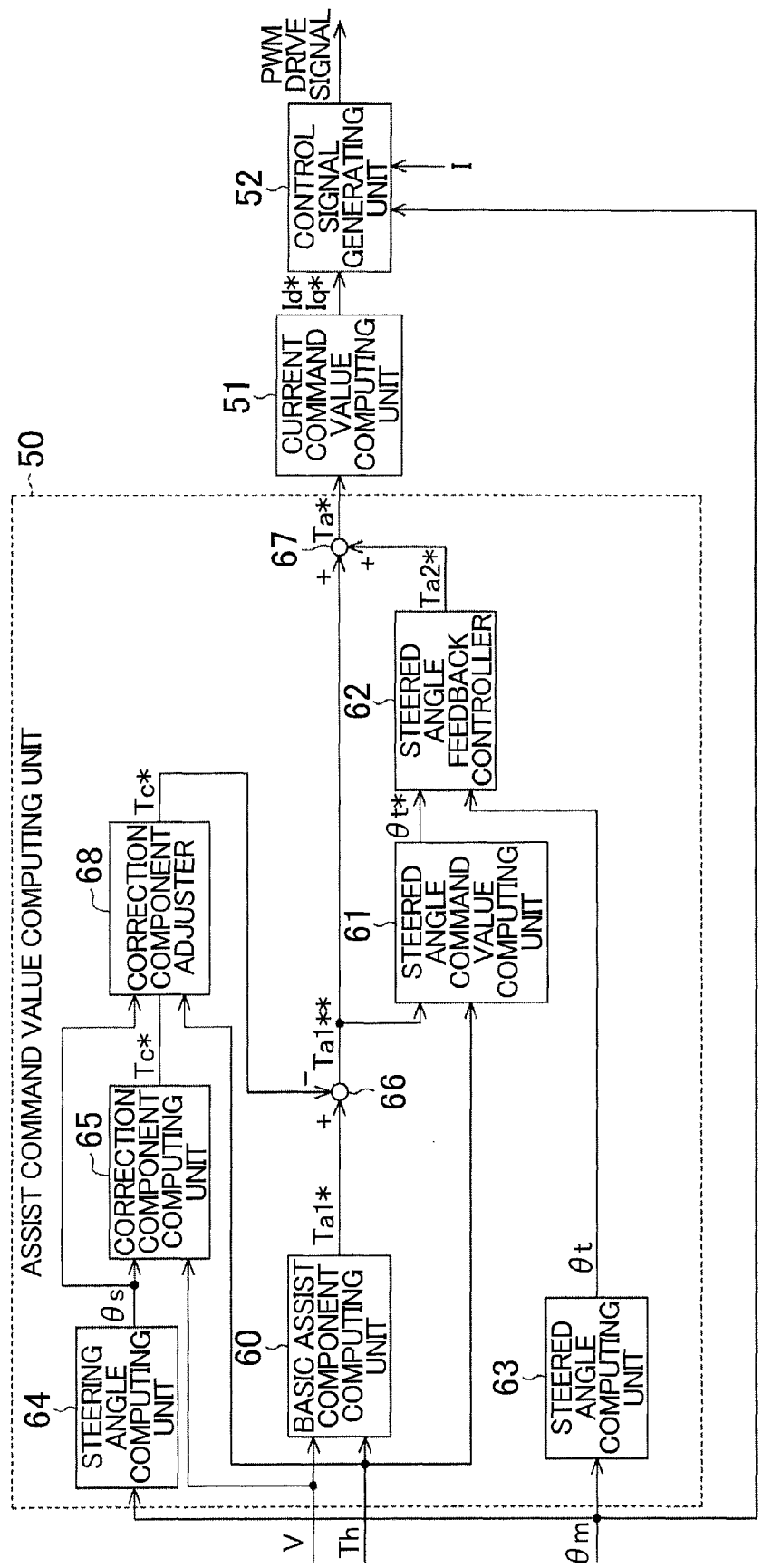
FIG. 19 is a control block diagram illustrating the configuration of a controller of an electric power steering system according to a second embodiment of the invention.

As illustrated in FIG. 19, the assist command value computing unit 50 according to the present embodiment includes a correction component adjuster 68 that adjusts the correction component Tc* based on the steering angle θs and the steering torque Th. As illustrated in FIG. 20, the correction component adjuster 68 includes a differentiator 110 that computes a steering velocity ω that is a differential value of the steering angle θs, a vehicle state determination unit 111 that determines a vehicle state, and an adjuster 112 that adjusts the correction component Tc*.

Figure 21:
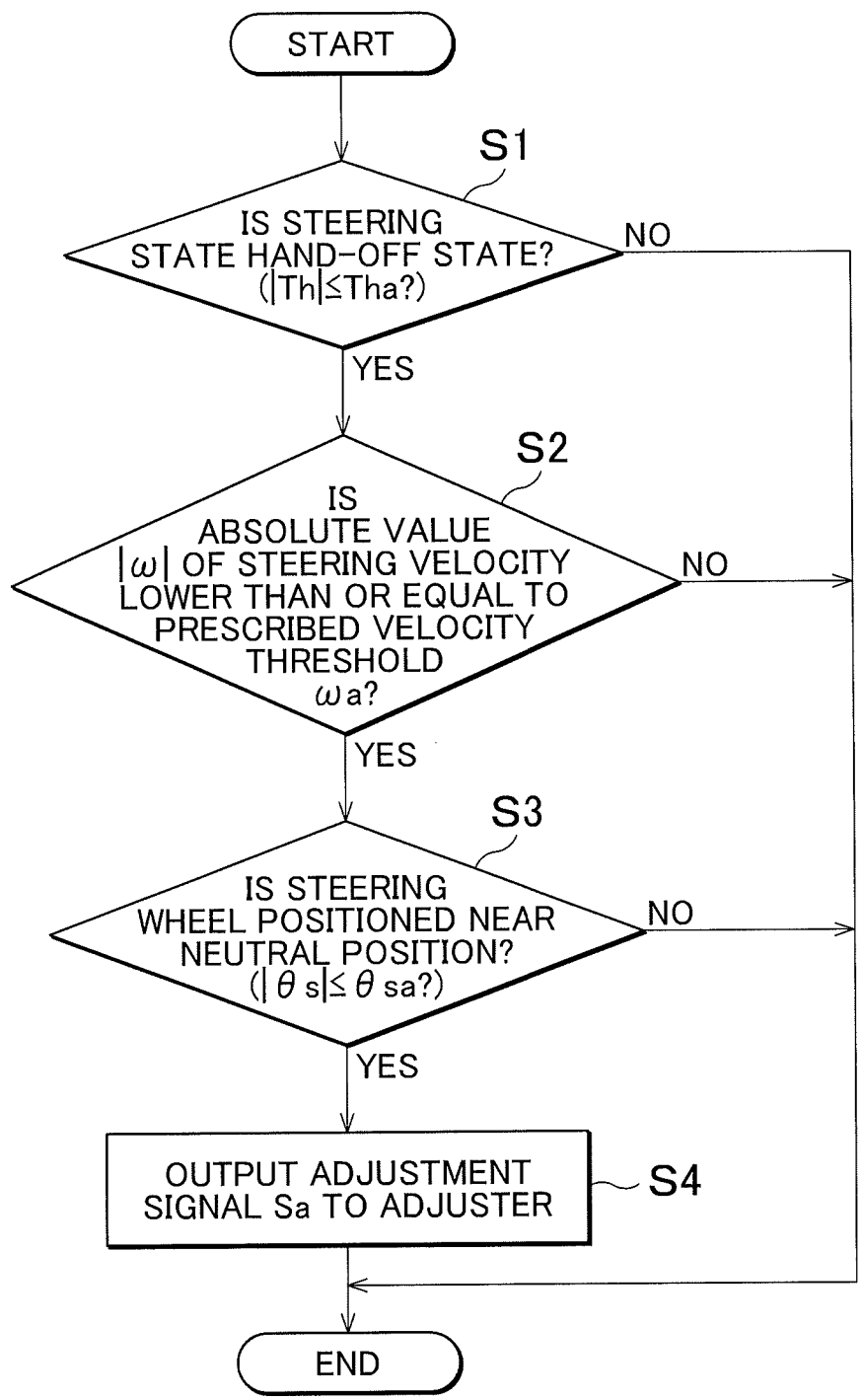
FIG. 21 is a flowchart illustrating the procedure of a process executed by a vehicle state determination unit in the second embodiment.

The vehicle state determination unit 111 determines whether the vehicle is in a vehicle state in which the correction component Tc* should be adjusted, based on the steering velocity ω computed by the differentiator 110, the steering angle θs, and the steering torque Th. As illustrated in FIG. 21, first, the vehicle state determination unit 111 determines whether the steering state is a hand-off state in which a driver takes his/her hands off the steering wheel 10, based on the steering torque Th (S1). Specifically, the vehicle state determination unit 111 determines whether the steering state is the hand-off state, based on whether the absolute value |Th| of the steering torque is smaller than or equal to a prescribed torque threshold Tha (>zero) (S1). The torque threshold Tha is set, in advance through, for example, an experiment, to such a value that whether the steering state is the hand-off state can be determined, and is then stored in a memory (not illustrated). When the steering state is the hand-off state (S1: YES), the vehicle state determination unit 111 determines whether the absolute value |ω| of the steering velocity is smaller than or equal to a prescribed velocity threshold ωa (>zero) (S2). The velocity threshold ωa is set, in advance through, for example, an experiment, to such a value that whether the steering wheel 10 is stopped or nearly stopped can be determined, and is then stored in the memory. When the absolute value |ω| of the steering velocity is smaller than or equal to the prescribed velocity threshold ωa (S2: YES), the vehicle state determination unit 111 determines whether the steering wheel 10 is positioned near the neutral position, based on the steering angle θs (S3). Specifically, the vehicle state determination unit 111 determines whether the steering wheel 10 is positioned near the neutral position, based on whether the absolute value |θs| of the steering angle is smaller than or equal to a prescribed angle threshold θsa (>zero) (S3). The angle threshold θsa is set, in advance through, for example, an experiment, to such a value that whether the steering wheel 10 is positioned near the neutral position can be determined, and is then stored in the memory. When the steering wheel 10 is positioned near the neutral position (S3: YES), the vehicle state determination unit 111 outputs an adjustment signal Sa to the adjuster 112 (S4).

On the other hand, when the steering state is not the hand-off state (S1: NO), when the absolute value |ω| of the steering velocity is larger than the prescribed velocity threshold ωa (S2: NO), or when the steering wheel 10 is not positioned near the neutral position (S3: NO), the vehicle state determination unit 111 ends the procedure without outputting an adjustment signal Sa.

Figure 22:
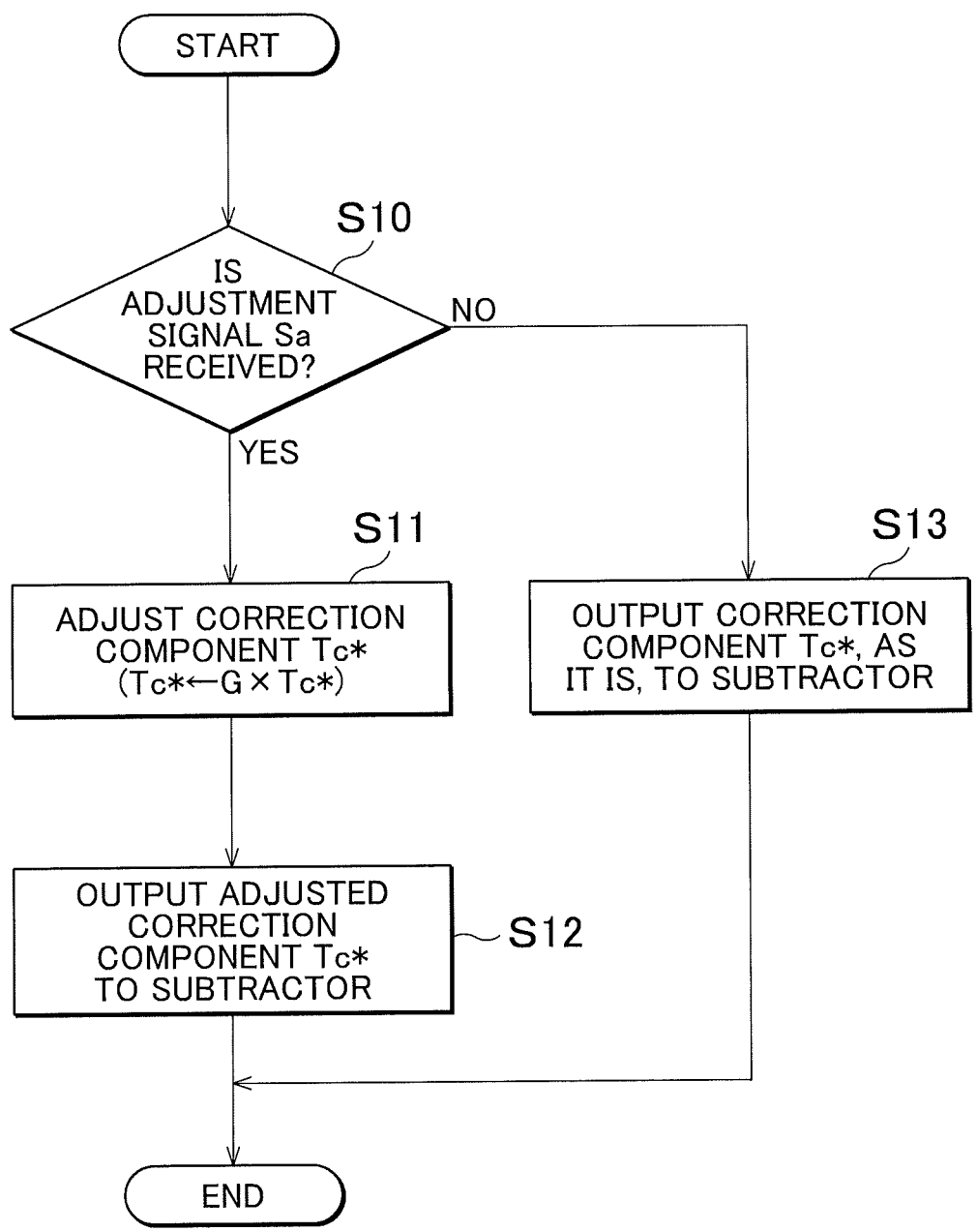
FIG. 22 is a flowchart illustrating the procedure of a process executed by an adjuster in the second embodiment.

The adjuster 112 adjusts the correction component Tc* based on the adjustment signal Sa transmitted from the vehicle state determination unit 111. Specifically, as illustrated in FIG. 22, first, the adjuster 112 determines whether the adjuster 112 has received the adjustment signal Sa (S10). When the adjuster 112 has received the adjustment signal Sa (S10: YES), the adjuster 112 adjusts the correction component Tc* by multiplying the correction component Tc* computed by the correction component computing unit 65 by the gain G (S11). The gain G is set to a value within a range equal to or larger than zero and smaller than one (zero≤G<one) in advance. That is, the adjusted correction component Tc* is set such that the absolute value of the adjusted correction component Tc* is smaller than the absolute value of the value computed by the correction component computing unit 65. The adjuster 112 outputs the adjusted correction component Tc* to the subtractor 66 (S12).

On the other hand, when the adjuster 112 has not received an adjustment signal Sa (S10: NO), the adjuster 112 outputs the correction component Tc* computed by the correction component computing unit 65, as it is, to the subtractor 66 (S13).

Hereinafter, the operation and advantageous effects of the electric power steering system according to the present embodiment will be described. When the driver takes his/her hands off the steering wheel 10 and then the steering wheel 10 stops immediately before the steering wheel 10 is returned to the neutral position, the absolute value |Tc*| of the correction component is set to a value smaller than the value computed by the correction component computing unit 65. Thus, the correction component Tc* is less likely to exert influence on the second assist component Ta2* and therefore the assist force corresponding to the second assist component Ta2* is more easily applied to the steering mechanism 1. Thus, the steering wheel 10 is more easily returned to the neutral position, and therefore the driver's burden of finely turning the steering wheel 10 to the neutral position is reduced.

Especially, when the gain G is set to zero, the correction component Tc* becomes zero. That is, the assist force corresponding to the second assist component Ta2* is applied, as it is, to the steering mechanism 1, and thus it is possible to more reliably return the steering wheel 10 to the neutral position.

In the case where the correction component Tc* is adjusted only based on the fact that the absolute value |Th| of the steering torque is smaller than or equal to the prescribed torque threshold Tha, for example, even when the steering torque Th temporarily becomes zero while the steering wheel 10 is returned, the correction component Tc* is adjusted. The adjustment of the correction component Tc* in such a situation may give the driver an uncomfortable feeling. However, in the present embodiment, the correction component Tc* is adjusted on the conditions that the absolute value |ω| of the steering velocity is smaller than or equal to the prescribed velocity threshold ωa, and that the absolute value |θs| of the steering angle is smaller than or equal to the prescribed angle threshold θsa (>zero). That is, the correction component Tc* is adjusted only in the state where the steering wheel 10 is stopped near the neutral position, or in a state immediately before the steering wheel 10 is stopped near the neutral position. Thus, the state where the correction component Tc* is adjusted while the steering wheel 10 is returned is less likely to occur. As a result, it is possible to improve the steering feel.

Figure 23:
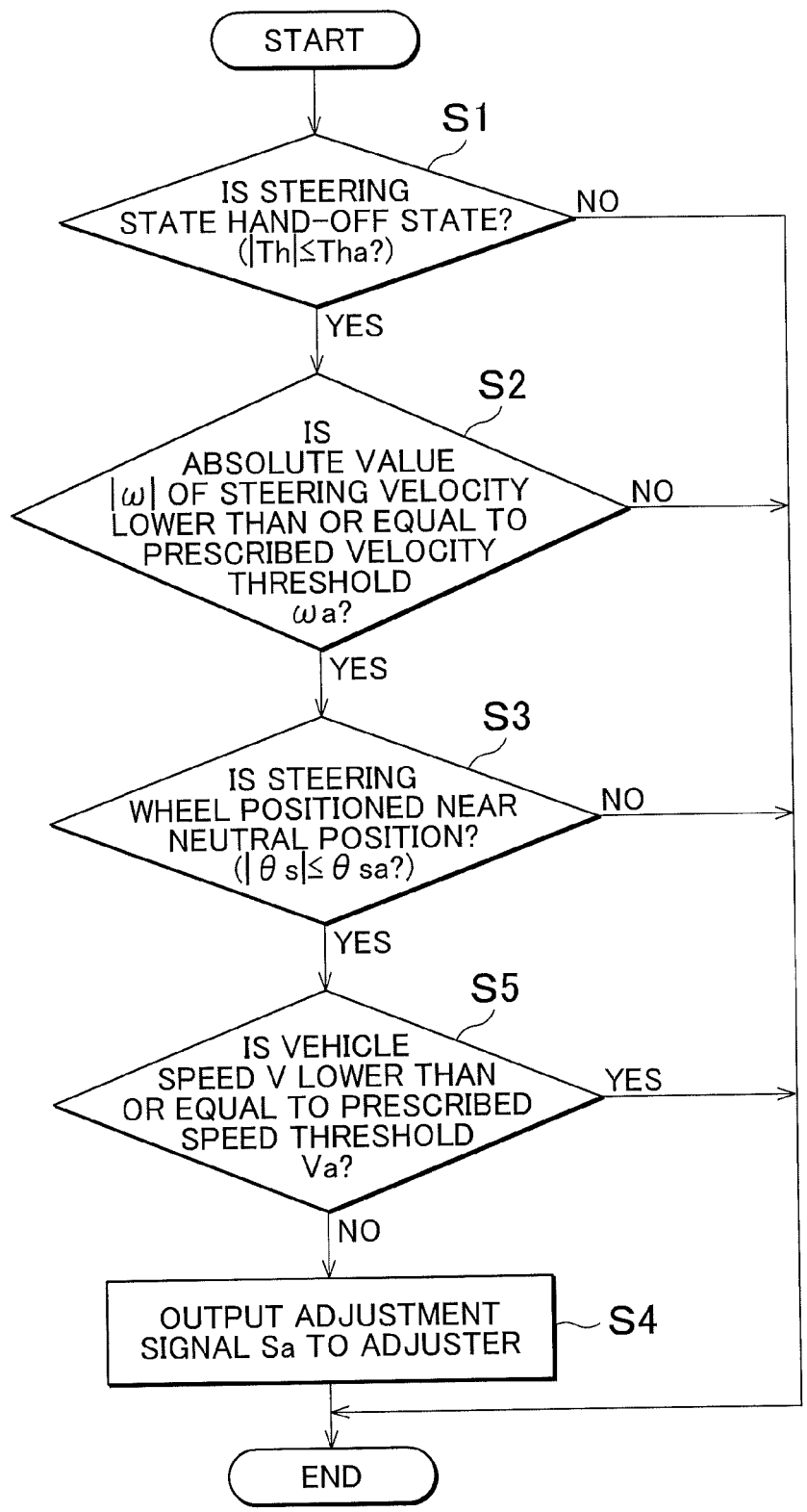
FIG. 23 is a flowchart illustrating the procedure of a process executed by a vehicle state determination unit in a first modified example of the second embodiment.

Next, a first modified example of the second embodiment will be described. In this modified example, the vehicle state determination unit 111 further determines the vehicle state based on the vehicle speed V detected by the vehicle speed sensor 6. Specifically, as illustrated in FIG. 23, when it is determined that the steering wheel 10 is positioned near the neutral position (S3: YES), the vehicle state determination unit 111 determines whether the vehicle speed V is lower than or equal to a prescribed speed threshold Va (S5). The speed threshold Va is set, in advance through, for example, an experiment, to such a value that whether the vehicle is travelling at a low speed can be determined, and is then stored in a memory. When the vehicle speed V exceeds the prescribed speed threshold Va (S5: NO), the vehicle state determination unit 111 outputs the adjustment signal Sa (S4). When the vehicle speed V is lower than or equal to the prescribed speed threshold Va (S5: YES), the vehicle state determination unit 111 does not output the adjustment signal Sa.

With this configuration, for example, in a state where the driver is driving the vehicle at a low speed in order to park the vehicle, the vehicle state determination unit 111 does not transmit the adjustment signal Sa to the adjuster 112, and thus the correction component Tc* is not adjusted. That is, the driver is able to feel a steering feel corresponding to the correction component Tc*, and thus it is possible to more reliably ensure a steering feel at the time of travelling at a low speed.

Figure 24:
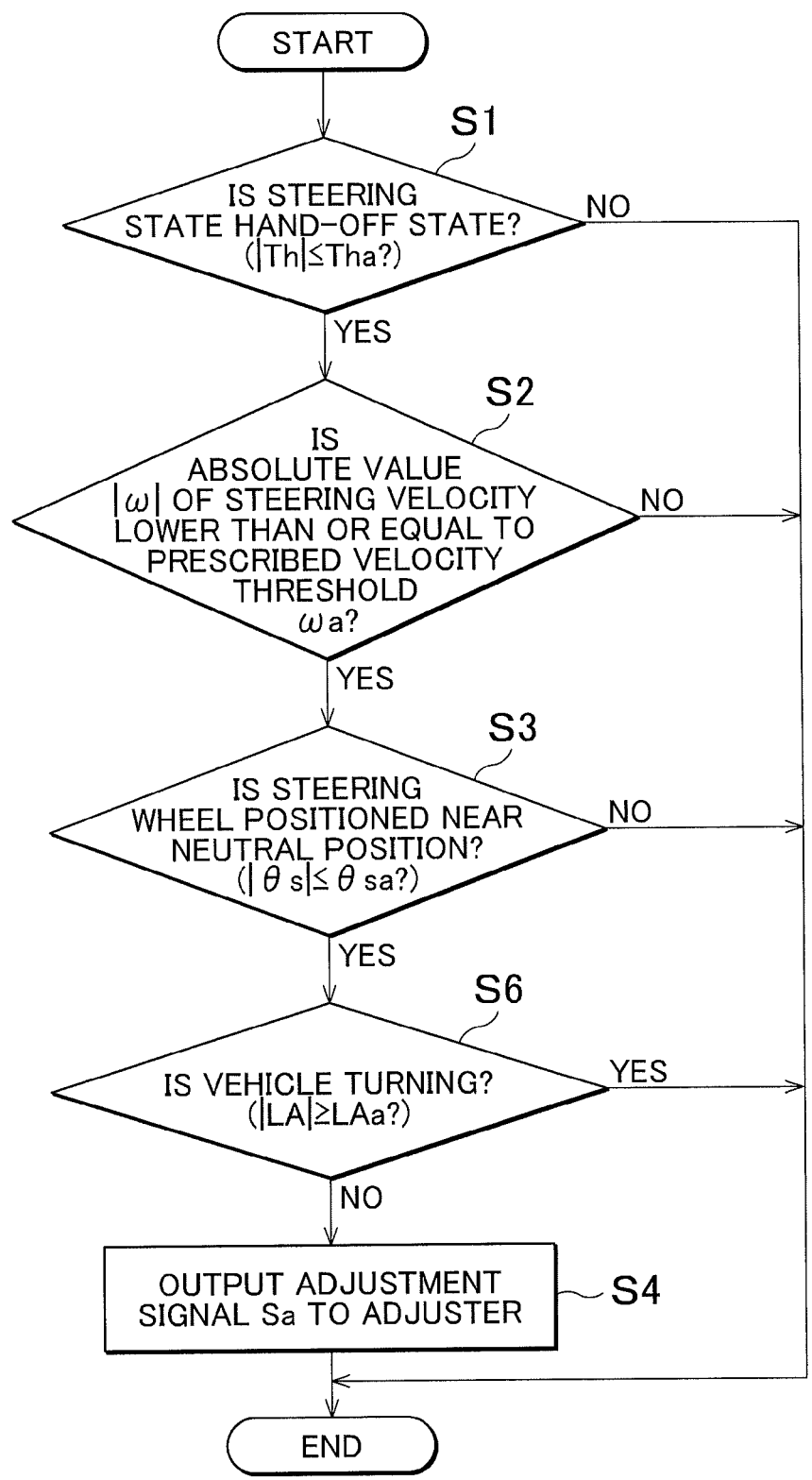
FIG. 24 is a flowchart illustrating the procedure of a process executed by a vehicle state determination unit in a second modified example of the second embodiment.

Next, a second modified example of the second embodiment will be described. As described by the broken line in FIG. 2, an electric power steering system in this modified example is provided with a lateral acceleration sensor 8 that detects a lateral acceleration LA (lateral G) of the vehicle. The vehicle state determination unit 111 further determines the vehicle state based on the lateral acceleration LA detected by the lateral acceleration sensor 8. Specifically, as illustrated in FIG. 24, when it is determined that the steering wheel 10 is positioned near the neutral position (S3: YES), the vehicle state determination unit 111 determines whether the vehicle is turning, based on the lateral acceleration LA (S6). The vehicle state determination unit 111 determines whether the vehicle is turning, based on whether the absolute value |LA| of the lateral acceleration is higher than or equal to an acceleration threshold LAa (S6). When it is determined that the vehicle is not turning (S6: NO), the vehicle state determination unit 111 outputs the adjustment signal Sa (S4). On the other hand, when it is determined that the vehicle is turning (S6: YES), the vehicle state determination unit 111 does not output the adjustment signal Sa.

With this configuration, when a lateral acceleration is applied to the vehicle, for example, while the vehicle is travelling along a curve in the road, the vehicle state determination unit 111 does not transmit the adjustment signal Sa to the adjuster 112, and thus the correction component Tc* is not adjusted. That is, the driver is able to feel a steering feel corresponding to the correction component Tc*, and thus it is possible to more reliably ensure a steering feel at the time of travelling along a curve in the road.

The above-described embodiments may be modified as follows.

The configuration of each of the first and second modified examples of the first embodiment may be applied to the electric power steering system according to the second embodiment and the electric power steering system in each modified example of the second embodiment.

In the second embodiment, the method of adjusting the correction component Tc* may be changed as needed. For example, the correction component Tc* may be decreased gradually with time from the value computed by the correction component computing unit 65 to a value obtained by multiplying the value computed by the correction computing unit 65 by the gain G.

In the second embodiment, it is determined whether the steering state is the hand-off state, based on the steering torque Th. However, the method of determining whether the steering state is the hand-off state should not be limited to the above-described method. For example, it may be determined whether the steering state is the hand-off state, based on the lateral acceleration LA detected by the lateral acceleration sensor 8.

In the second embodiment, it is determined whether the steering wheel 10 is positioned at the neutral position, based on the steering angle θs. However, the method of determining whether the steering wheel 10 is positioned at the neutral position should not be limited to the above-described method. For example, as indicated by the broken line in FIG. 2, the electric power steering system is provided with a yaw rate sensor 9 that detects a yaw rate YR of the vehicle. It may be determined whether the steering wheel 10 is positioned at the neutral position, based on the yaw rate YR detected by the yaw rate sensor 9.

In the second modified example of the second embodiment, it is determined whether the vehicle is turning, based on the lateral acceleration LA. However, the method of determining whether the vehicle is turning should not be limited to the above-described method. For example, it may be determined whether the vehicle is turning, based on the yaw rate YR detected by the yaw rate sensor 9 illustrated in FIG. 2.

The first and second modified examples of the second embodiment may be combined together.

The shape of each of the returning operation map M10 and the turning operation maps M11, M12 may be modified as needed.

In the above-described embodiments, the second reference angle θ2 of the first turning operation map M11 and the third reference angle θ3 of the second turning operation map M12 are individually set. However, the second reference angle θ2 and the third reference angle θ3 may be the same value. That is, the two turning operation maps M11, M12 may be combined into one turning operation map such that the first reference angle θ1 and the third reference angle θ3 are the same value, and the one turning operation map may be used.

In the above-described embodiments, the returning operation map M10 and the two turning operation maps M11, M12 are individually prepared. Alternatively, for example, there may be used a first map obtained by combining together the returning operation map M10 and the first turning operation map M11 such that the first reference angle θ1 and the second reference angle θ2 are the same value; and a second map obtained by combining together the returning operation map M10 and the second turning operation map M12 such that the first reference angle θ1 and the third reference angle θ3 are the same value. As described above, the maps used by the correction component computing unit 65 may be modified as needed.

In the above-described embodiments, the gain adjuster 74 adjusts the amplification factor of the selected correction component Tcs* to a larger value as the vehicle speed V becomes higher. However, the gain adjuster 74 may adjust the amplification factor of the selected correction component Tcs* to a smaller value as the vehicle speed V becomes higher. That is, the method of adjusting the amplification factor should not be limited as long as the amplification factor of the correction component Tc* is changed based on the vehicle speed V. When the amplification factor of the correction component Tc* need not be changed, the gain adjuster 74 may be omitted and the selected correction component Tcs* selected by the selector 73 may be used, as it is, as the correction component Tc*.

In the above-described embodiments, the correction component computing unit 65 computes the correction component Tc* based on the steering angle θs. However, the invention is not limited to this configuration. The correction component Tc* may be computed with the use of any parameter that can be converted into the steering angle θs, such as the steered angle θt.

The steered angle command value computing unit 61 is not limited to the computing unit that computes the steered angle command value θt* with the use of the ideal model. For example, the steered angle command value computing unit 61 may be a computing unit that computes the steered angle command value θt* through map computation, like the basic assist component computing unit 60.

In the above-described embodiments, each of the rotation angle sensor 7 and the steered angle computing unit 63 is used as a detector that detects the steered angle θt. However, the invention is not limited to this configuration. For example, a sensor that detects a rotation angle of the steering shaft 11, or a sensor that directly detects a steered angle θt may be used as a detector that detects the steered angle θt.

The steered angle feedback control may be executed with the use of any parameter that can be converted into the steering angle θs, such as the steered angle θt. The basic assist component computing unit 60 sets the first assist component Ta1\* based on the steering torque Th and the vehicle speed V. However, the basic assist component computing unit 60 may set the first assist component Ta1\*, for example, based on only the steering torque Th. There may be executed so-called phase compensation control for changing the phase of the detected steering torque Th of the torque sensor 5 based on a rate of change (assist gradient) of the first assist component Ta1\* with respect to the steering torque Th.

In the above-described embodiments, the correction component Tc\* is subtracted from the first assist component Ta1\* computed by the basic assist component computing unit 60. Alternatively, for example, the first assist component Ta1\* and the second assist component Ta2\* may be added together, and then the correction component Tc\* may be subtracted from the sum of the first assist component Ta1\* and the second assist component Ta2\*. In this case, the steered angle command value computing unit 61 computes the steered angle command value θt\* based on the sum of the first assist component Ta1\* and the steering torque Th.

In the above-described embodiments, the invention is applied to the electric power steering system that applies assist force generated by the motor 20 to the steering shaft 11. Alternatively, the invention may be applied to an electric power steering system that applies assist force generated by the motor to the rack shaft 13.

What is claimed is:

1. An electric power steering system comprising:
   an assist mechanism that applies assist force generated by a motor to a steering mechanism of a vehicle; and
   a controller that controls driving of the motor based on an assist command value that is a target value of a torque output from the motor,
   the controller including
      a basic assist component computing unit that computes a first assist component that is a basic component of the assist command value, based on a steering torque applied to a steering wheel,
      a steered angle command value computing unit that computes a steered angle command value that is a target value of a steered angle of steered wheels, based on a sum of the steering torque and the first assist component,
      a steered angle feedback controller that computes a second assist component by executing steered angle feedback control for causing an actual steered angle of the steered wheels to follow the steered angle command value,
      a correction component computing unit that computes a correction component based on a steering angle of the steering wheel, and
      an assist command value computing unit that computes the assist command value on the basis of a value obtained by subtracting the correction component from a sum of the first assist component and the second assist component.

2. The electric power steering system according to claim 1, wherein the correction component has a hysteresis characteristic with respect to a change in the steering angle.

3. The electric power steering system according to claim 2, wherein:
   the correction component computing unit has
      a returning operation map that defines a relationship between the steering angle and a first correction component, the relationship corresponding to a returning operation of the steering wheel, and
      a turning operation map that defines a relationship between the steering angle and a second correction component, the relationship corresponding to a turning operation of the steering wheel; and
   the correction component computing unit computes the correction component based on the first correction component and the second correction component.

4. The electric power steering system according to claim 3, wherein:
   the returning operation map is defined such that the first correction component is zero when the steering angle is a first reference angle, and the first correction component is proportional to the steering angle;
   the turning operation map includes
      a first turning operation map that is defined such that the second correction component is zero when the steering angle is a second reference angle, the second correction component increases as the steering angle changes from the second reference angle in one steering direction, and an absolute value of a rate of change in the second correction component with respect to the steering angle decreases as the steering angle changes in the one steering direction, and
      a second turning operation map that is defined such that the second correction component is zero when the steering angle is a third reference angle, the second correction component decreases as the steering angle changes from the third reference angle in the other steering direction that is opposite to the one steering direction, and an absolute value of a rate of change in the second correction component with respect to the steering angle decreases as the steering angle changes in the other steering direction; and
   the correction component computing unit includes
      a first computing unit that computes the first correction component based on the returning operation map,
      a second computing unit that computes the second correction component based on the first turning operation map when the steering angle is larger than or equal to the first reference angle, and that computes the second correction component based on the second turning operation map when the steering angle is smaller than the first reference angle,
      a first updating unit that updates the first reference angle when a direction in which the steering angle changes is reversed,
      a second updating unit that updates the second reference angle when a sign of a difference value obtained by subtracting the first reference angle from the steering angle changes from a negative sign to a positive sign,
      a third updating unit that updates the third reference angle when the sign of the difference value changes from the positive sign to the negative sign, and
      a selector that selects, as the correction component, a correction component having a smaller absolute value among the first correction component computed by the first computing unit and the second correction component computed by the second computing unit.

5. The electric power steering system according to claim 4, wherein:

the returning operation map is defined by an expression, $Tc1^* = k \cdot (\theta s - \theta 1)$ where $\theta 1$ is the first reference angle, $\theta s$ is the steering angle, $Tc1^*$ is the first correction component, and k is a proportional constant of the first correction component with respect to the steering angle; and when the direction in which the steering angle changes is reversed, the first updating unit computes the first reference angle $\theta 1$ by substituting an immediately preceding value of the correction component selected by the selector and an immediately preceding value of the steering angle respectively for $Tc1^*$ and $\theta s$ in the expression, and updates the first reference angle $\theta 1$ based on a computed result.

6. The electric power steering system according to claim 4, wherein when the sign of the difference value changes from the negative sign to the positive sign, the second updating unit updates the second reference angle to the same value as the first reference angle; and when the sign of the difference value changes from the positive sign to the negative sign, the third updating unit updates the third reference angle to the same value as the first reference angle.

7. The electric power steering system according to claim 6, wherein when the sign of the difference value changes from the negative sign to the positive sign, the second updating unit sets the second reference angle to a value smaller than the first reference angle; and when the sign of the difference value changes from the negative sign to the positive sign, the third updating unit sets the third reference angle to a value larger than the first reference angle.

8. The electric power steering system according to claim 1, wherein the correction component computing unit has a gain adjuster that changes an amplification factor of the correction component based on a vehicle speed.

9. The electric power steering system according to claim 1, wherein the correction component computing unit has a correcting unit that increases a rate of change in the correction component with respect to the steering angle as an absolute value of the steering angle increases.

10. The electric power steering system according to claim 2, wherein the controller further includes a correction component adjuster that sets an absolute value of the correction component to a value smaller than an absolute value of the correction component computed by the correction component computing unit when a condition that a steering state of the steering wheel is a hand-off state, a condition that a steering velocity of the steering wheel is lower than or equal to a prescribed velocity threshold, and a condition that the steering wheel is positioned near a neutral position are all satisfied.

11. The electric power steering system according to claim 10, wherein the correction component adjuster determines whether the steering state is the hand-off state, based on a lateral acceleration of the vehicle.

12. The electric power steering system according to claim 10, wherein the correction component adjuster determines whether the steering wheel is positioned near the neutral position, based on a yaw rate of the vehicle.

13. The electric power steering system according to claim 10, wherein when a vehicle speed is lower than or equal to a prescribed speed threshold, the correction component adjuster does not adjust the correction component.

14. The electric power steering system according to claim 10, wherein when the vehicle is turning, the correction component adjuster does not adjust the correction component.

15. The electric power steering system according to claim 14, wherein the correction component adjuster determines whether the vehicle is turning, based on the lateral acceleration of the vehicle or the yaw rate of the vehicle.

* * * * *